United States Patent

Ellis et al.

[15] 3,675,214

[45] July 4, 1972

[54] PROCESSOR SERVICING EXTERNAL DEVICES, REAL AND SIMULATED

[72] Inventors: David R. Ellis; John Michels, both of Holmdel; Ira Gabbert, Neptune, all of N.J.

[73] Assignee: Interdata, Incorporated

[22] Filed: July 17, 1970

[21] Appl. No.: 55,894

[52] U.S. Cl. ....................................340/172.5, 444/1

[51] Int. Cl. ....................................G06f 9/16, G06f 9/18

[58] Field of Search ....................340/172.5; 235/157; 444/1

[56] References Cited

UNITED STATES PATENTS

| | | | |
|---|---|---|---|
| 3,411,147 | 11/1968 | Packard | 340/172.5 |
| 3,579,192 | 5/1971 | Rasche et al. | 340/172.5 |
| 3,500,328 | 3/1970 | Wallis | 340/172.5 |
| 3,541,520 | 11/1970 | Mullery et al. | 340/172.5 |
| 3,510,843 | 5/1970 | Bennett et al. | 340/172.5 |
| 3,366,929 | 1/1968 | Mullery et al. | 340/172.5 |
| 3,391,394 | 7/1968 | Ottaway et al. | 340/172.5 |
| 3,405,258 | 10/1968 | Godoy et al. | 340/172.5 |
| 3,389,376 | 6/1968 | Packard | 340/172.5 |
| 3,483,521 | 12/1969 | Frasier et al. | 340/172.5 |
| 3,523,283 | 8/1970 | Cohen et al. | 340/172.5 |

*Primary Examiner*—Paul J. Henon
*Assistant Examiner*—Mark Edward Nusbaum
*Attorney*—Maleson, Kimmelman and Ratner and Allan Ratner

[57] ABSTRACT

This invention pertains to the performance of a microroutine in accordance with a program being run on a processor having user's instructions in main memory. External devices having discrete device numbers cause interrupt signals to be transmitted to the microroutine which acknowledges the interrupt signal and obtains the device number associated with the signal. A service pointer is fetched from the service pointer table in the main memory corresponding to the device number, which in turn defines a service block function to be fetched from the main memory. Input - output service is then performed for the external devices in accordance with the interrupt service block function without interrupting the program that is being currently run.

6 Claims, 11 Drawing Figures

INVENTORS.
DAVID R. ELLIS
JOHN MICHELS
IRA GABBERT
BY
Maleson, Kimmelman & Ratner
ATTORNEYS INVENTORS
DAVID R. ELLIS
JOHN MICHELS
IRA GABBERT
BY
Maleson, Kimmelman & Ratner
ATTORNEYS INVENTORS
DAVID R. ELLIS
JOHN MICHELS
IRA GABBERT
BY
Maleson, Kimmelman & Ratner
ATTORNEYS INVENTORS.
DAVID R. ELLIS
JOHN MICHELS
IRA GABBERT
BY Maleson, Kimmelman & Ratner
ATTORNEYS INVENTORS
DAVID R. ELLIS
JOHN MICHELS
IRA GABBERT
BY Malcolm, Kimmelman & Ratner
ATTORNEYS INVENTORS.
DAVID R. ELLIS
JOHN MICHELS
IRA GABBERT
BY Malson, Kimmelman & Ratner
ATTORNEYS

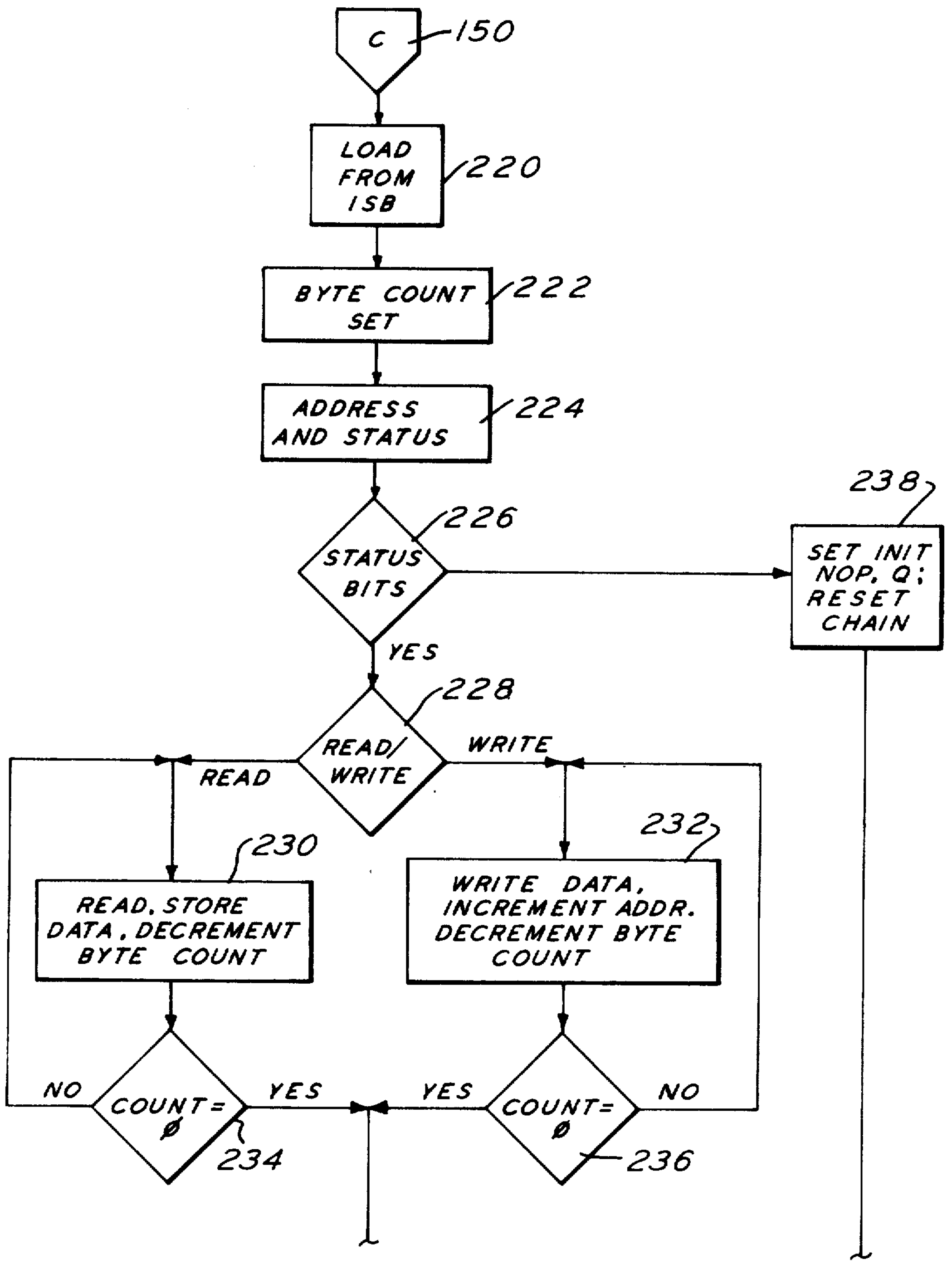
FIG. 5B₁
INVENTORS
DAVID R. ELLIS
JOHN MICHELS
IRA GABBERT
BY Maleson, Kimmelman & Ratner
ATTORNEYS

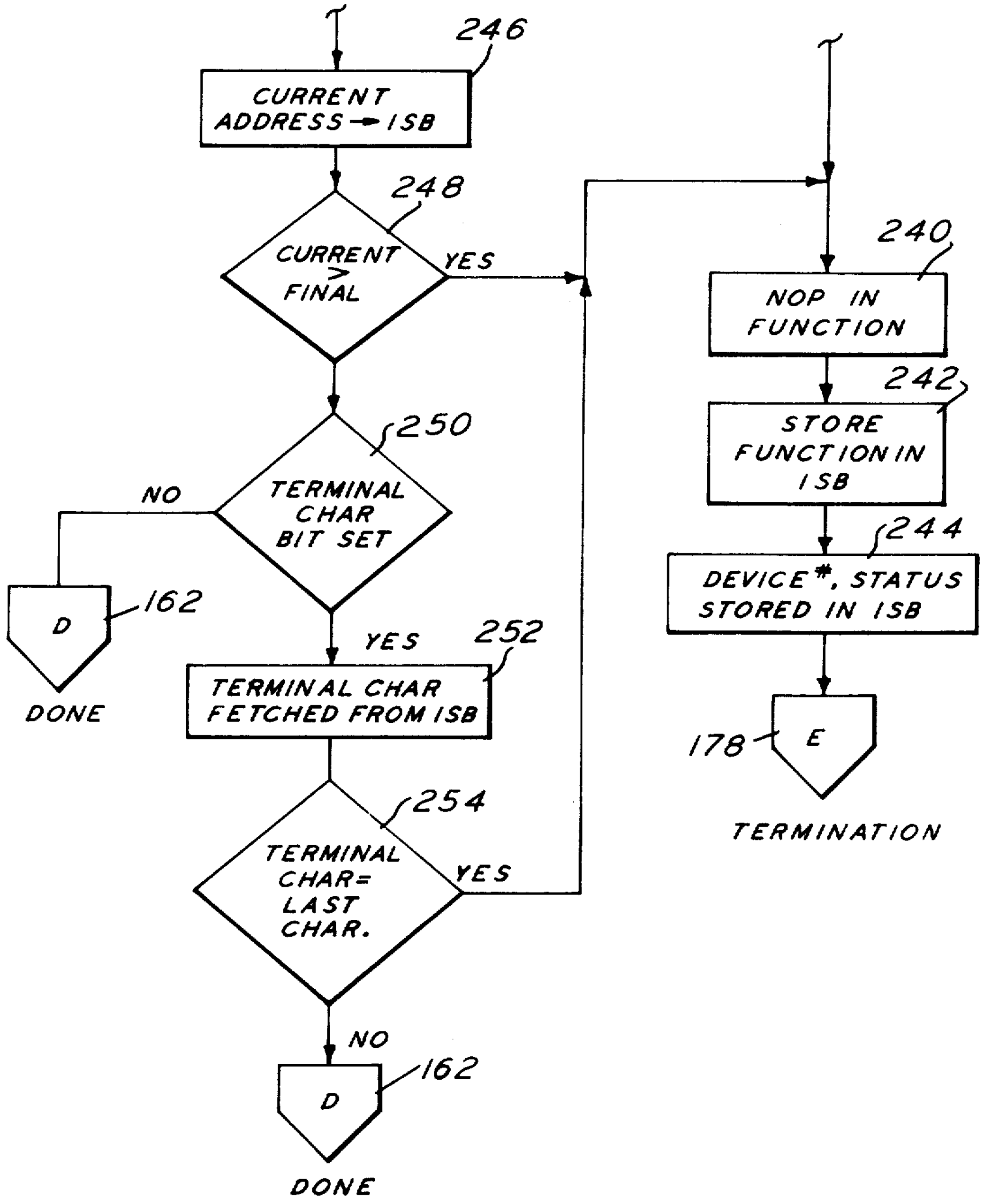
FIG. 5B2
INVENTORS.
DAVID R. ELLIS
JOHN MICHELS
IRA GABBERT
BY
Maleson, Kimmelman & Ratner
ATTORNEYS INVENTORS.
DAVID R. ELLIS
JOHN MICHELS
IRA GABBERT
BY Malcolm, Kimmelman & Gatner
ATTORNEYS INVENTORS
DAVID R. ELLIS
JOHN MICHELS
BY IRA GABBERT
Malcolm, Kimmelman + Ratner
ATTORNEYS

PROCESSOR SERVICING EXTERNAL DEVICES, REAL AND SIMULATED

BACKGROUND OF THE INVENTION

A. Field of the Invention

This invention relates to the field of art of general purpose digital processors performing microinstructions.

B. Prior Art

In the field of relatively small scale processors, microprograms have been used to provide a high degree of flexibility and economy. By using microprogramming incorporated in a read only memory (ROM), the processor computation time for a set of specific operations may be significantly decreased. However, a significant problem with such microprogrammed processors has been in their limitation in real - time response. Specifically, in prior processors, there has been one core location reserved for exchanging program status words (PSW) when an external attention came in. At this time, the processor is required to generate an interrupt and use software to acknowledge the interrupt and then identify the device and take the necessary action. This operation has been relatively time consuming and utilized a large amount of core memory for the extra routines and for device tables.

SUMMARY OF THE INVENTION

A system and method for performing a microroutine with respect to a program being run on a processor having user's instructions in main memory. External devices (or the processor simulating external devices) cause interrupt signals to be generated having discrete device numbers. The system acknowledges the interrupt signals in accordance with the user's instructions and performs programmed instructions of the microroutine after acknowledging the interrupt signals without interrupting a currently running program. The microroutine being run is contained in a read only memory separate and distinct from the processor main memory.

BRIEF DESCRIPTION OF THE DRAWINGS

FIGS. 5B$_1$ – B$_2$ taken together illustrate the data transfer sequence to either a done phase or a termination phase;

DEFINITIONS

Microinstruction — hardware level instruction which causes a specific machine operation to occur.

Microprogram — a collection of microinstructions which causes a specific user instruction or other functions to be executed.

Microroutine — a functional segment of a microprogram.

User instruction — an instruction by the programmer which is placed in core memory.

Interrupt — an instruction to stop running program, save the status of that program, exchange program status word (PSW) to branch to a new program designed to service that interrupt, and execute the new program.

Attention — an external interrupt signal which is a request from a peripheral device for processor service.

Microoperations — there are ten basic kinds of microoperations which are combined in the microprogram to cause the hardware to take those steps necessary at the hardware level to perform user instructions. These microoperations may be any one of the following:

| | | |
|---|---|---|
| A | Add L | Load |
| S | Subtract C | Command |
| X | Exclusive OR T | Test |
| N | AND B | Branch on Condition |
| O | Inclusive OR D | Decode |

Formats - there are four possible formats and the ten microoperations fall into any one of four of these formats:

Register to Register Format

Add, Subtract, Exclusive OR,

AND, Inclusive OR, and Load

RD Register 34

| 0 – 3 | 4 – 7 | 8 – 11 | 12 – 15 |
|---|---|---|---|
| OP–Code | D | S | E |

D = Destination field: the result of the operation is placed into the register whose address is in this field.

S = Source field: the address of the register containing the second operand is in this field. The first operand comes from the A Register (AR).

E = Extended operation field: specifies options within the operation.

IMMEDIATE FORMAT

Add Immediate, Subtract Immediate,

Exclusive OR Immediate, AND Immediate,

Inclusive OR Immediate, and Load Immediate.

Register 34

| 0 – 3 | 4 – 7 | 8 – 15 |
|---|---|---|
| OP–Code | D | Data |

D = Destination field: the result of the operation is placed into the register whose address is in this field.

DATA = the second operand is in this field. The first operand comes from the A Register (AR).

TEST AND COMMAND FORMAT

Register 34

| 0 – 3 | 4 – 15 |
|---|---|
| OP–Code | TC–Code |

TC Code = Test or Command Code. Specifies the signal to be tested, or specifies the command to be performed.

BRANCH ON CONDITION FORMAT

Register 34

| 0 – 3 | 4 | 5 | 6 | 7 | 8 – 15 |
|---|---|---|---|---|---|
| OP–Code | C | V | G | L | Address |

C = Carry
V = Overflow
G = Greater than zero
L = Less than zero
ADDRESS = if any specified condition (C, V, G, or L is met, the program is transferred to the 8-bit address specified by this field.

DESCRIPTION OF THE PROCESSOR 10 HARDWARE OF FIGS. 1A-B

Figure 1A:
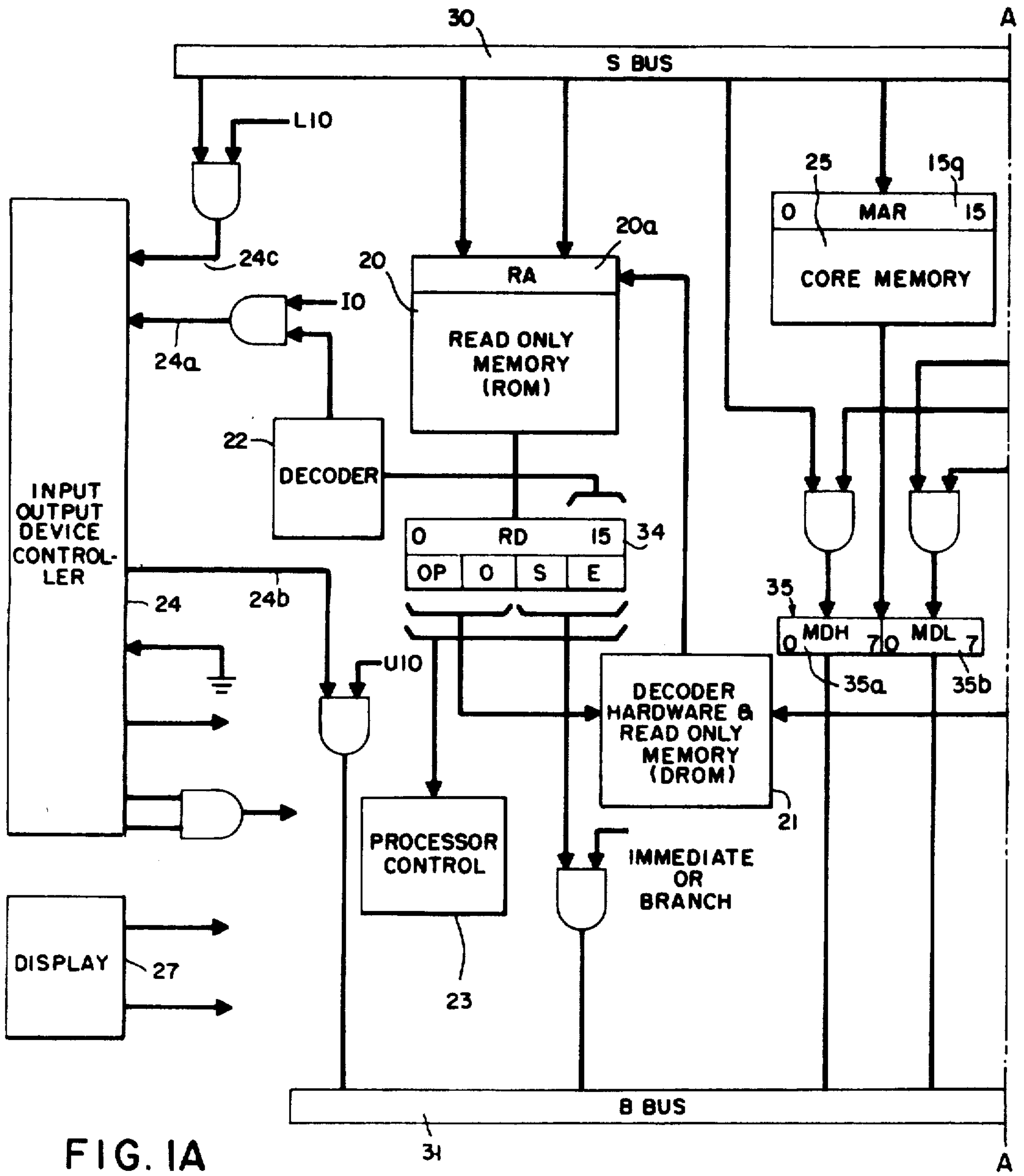
FIGS. 1A – B taken together illustrate in block diagram form a general digital processor for performing microinstructions in accordance with the invention.
Figure 1B:
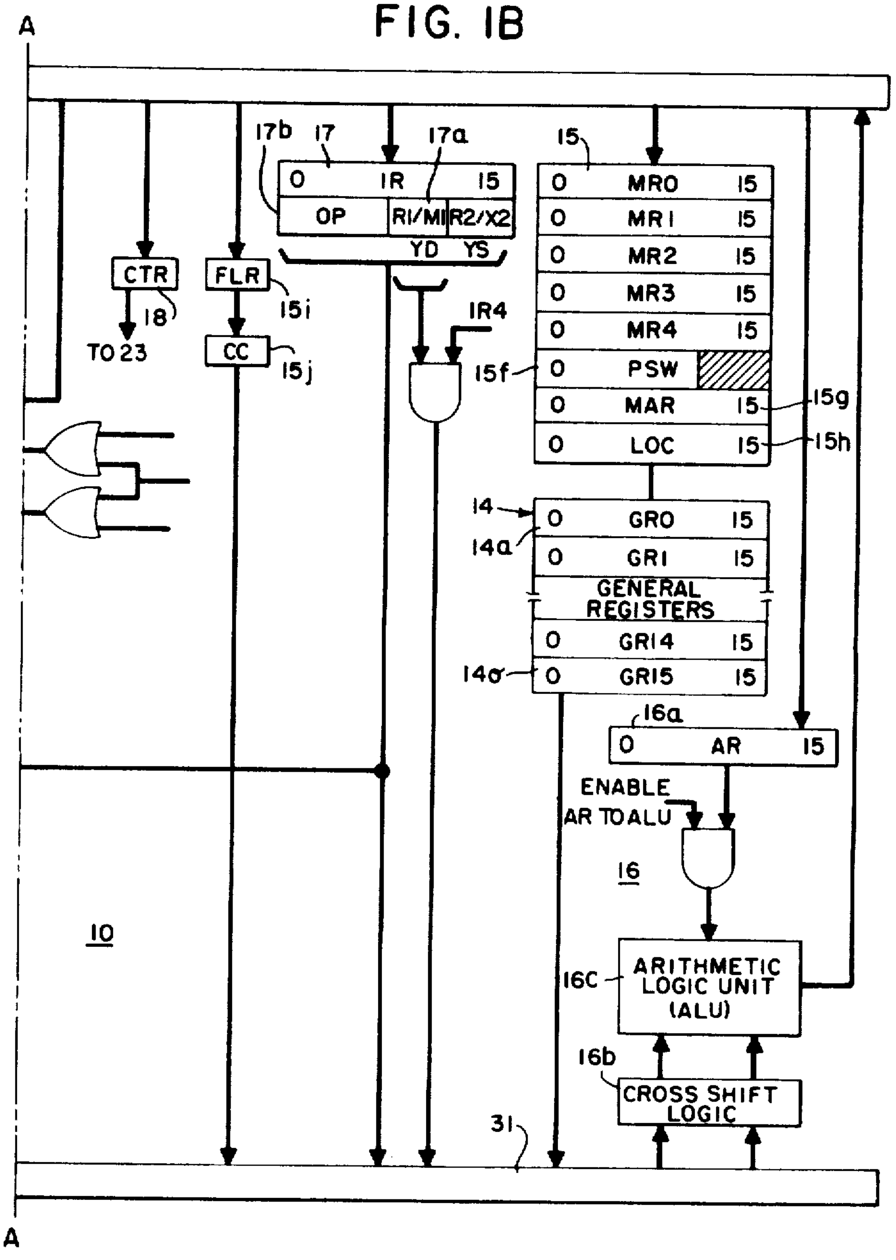

Referring now to FIGS. 1A-B there is shown a general purpose digital processor 10 designed to perform microinstructions. These microinstructions are programmed into subroutines that are permanently wired so that the read out can not be changed by the program. Combinations of subroutines perform the more complex operations that make up each of the user's instructions. There are certain functions that must be performed regardless of the user's instruction to be done. Namely that instruction must be fetched from a core memory 25, decoded and then executed. Processor 10 comprises 16, 16 bit general registers 14, an arithmetic logic unit (ALU) 16, and instruction register (IR) 17, read only memory 20, a decoder read only memory (DROM) 21, an input-output system 24, a core memory 25, a set of microregisters 15, control logic 23 and a display system 27. The foregoing main systems of processor 10 are connected between S and B busses 30 and 31 respectively by way of ALU 16 in conventional manner.

The operation of processor 10 basically centers around ROM 20 which contains the microprogram and which directs all of the operations within processor 10. The ROM locations are addressed by a 12 bit register RA 20*a*. Information read from ROM 20 is placed in a 16-bit data register (RD) 34. Bits 0–3 of RD 34 specify a microoperation to be performed which in turn defines the meaning of the remaining 12 bits. The microprogram is prewired in ROM 20 by weaving wires through transformers. The microinstructions read from ROM 20 direct processor 10 by way of processor control unit 23. Unit 23, may, depending on the microcode, set up the ALU 16 to a desired mode of operation, test for specified hardware conditions, issue functional commands to establish hardware conditions, initiate memory cycles, set up microprogram loops or load and unload selected registers in the hardware register stacks 14 and 15. An explanation of a typical processor control 23 performing the functions listed herein is detailed in GE–635 Systems Manual, pages III-1 to III-10 and IV-2 to IV-7.

There are five general purpose microregisters 15*a–e* labeled MR0–MR each of which has a capacity of 16 bits and is directly addressable from RD 34. Registers 15*a–e* are general purpose registers and may be used for differing purposes by the microprogram. However, program status word (PSW) register 15*f* is a 16 bit register which has a specific use in processor 10. The microprogram must use register 15*f* as well as registers 15*g–h* in a specific manner. Register 15*f* indicates the system status relative to the user program being executed. Bits 0–11 of register 15*f* define machine status. Bits 12–15 are set apart in a condition code register (15*j*) which may be loaded only from a flag register 15*i*. When register 15*f* is loaded, bits 12–15 of buss 30 are loaded into register 15*i* instead of register 15*j*. This propagates user status from the user level to the microlevel at which the hardware operates. FLR register 15 *i* and ultimately register 15*j* reflect the results of the microinstruction, or instructions in the case of a user microroutine, just performed.

The location counter (LOC) 15*h* is a 16-bit appendum to register 15*f* which holds the address of the next user instruction to be performed. Register 15*h* is directly addressable by register 34. However, register 15*h* may be forceably selected, regardless of register 34 in the decode microinstruction, later to be described.

A memory address register (MAR) 15*g* is a 16-bit register used to address locations in core memory 25. Register 15*g* appears twice, once on the interface to core memory 25 and once in processor registers 15. Loaded into core memory 25 are the functions shown for interrupt service block (ISB) of FIGS. 4A and ISB function code of FIG. 4B.

A memory data register 35 is a 16-bit register used to hold data read from or written into core memory 25. Register 35 is directly addressable by register 34. Register 35 is separated into two bytes (MDH)register 35*a* and MDL register 35*b* which may be loaded separately on cross shift operations.

IR register 17 is a 16-bit register used to hold the user's instruction currently being processed. Register 17 is directly addressable by register 34. In addition, provision is made for unloading only bits 8–11 of register 17 to bits 12–15 of B buss 31 for comparison between the mask (M1) 17a field and the register 15*i* when executing user's branches. Bits 0–7 of register 17 (the user's operation code 17*b*) are used to address locations in DROM 21. The remaining 8 bits select general registers 14.

Each of the general registers 14 has a capacity of 16 bits. These user's registers (GR0-GR15) 14*a–o* are not directly addressable from register 34. In the prior description all registers have been directly addressed from register 34. However, the general register 14 selection is indirectly made. To access a particular register 14*a–o* it is necessary to address the appropriate IR 17 field which contains the address of the desired user's register 14*a–o*. To access the register specified by IR 17 bits 8–11, user's designation (YD) is addressed; to access the register specified by IR bits 12–15, user's source (YS) is addressed.

Specifically, an address is taken from register 34 and that address points the processor to YD or YS. The number that occurs at YD or YS is decoded to select a particular one of the general registers 14*a–o*. Accordingly, it is necessary that IR register 17 contain the proper address before one of the registers 14*a–o* is selected. DROM 21 may comprise up to a maximum of 128 prewired words each 12 bits long by means of a read only memory in which the cores are wired in the manner well known in the art.

DROM 21 is interrogated only on a decode microinstruction and the resulting 12 bit read out is loaded into RA register 20*a*. DROM 21 holds the starting addresses of the microroutines required to perform user's instructions. Register 20*a* may also be loaded with hardware generated addresses in the decode microinstruction. The most significant bit (MSB) of the DROM 21 output designates whether or not that particular user instruction is priveleged. PSW bit 7, 15*f*, if set by the user program, enables priveleged instruction (PI) to be dropped. Then if a PI is attempted with PSW 07 set, the hardware forces an internal illegal instruction interrupt by way of clearing the register 20*a*.

Counter register 18 is a four bit decrementing register. It may be preloaded with any number from 0 to 15 to count the number of repetitions of a single microinstruction or a block of microinstructions. This counter is used in the multiply or divide sequences to cause 16 iterations of the microinstruction sets as will later be described with respect to the multiply or divide sequences to cause 16 iterations of the microinstruction sets as will later be described with respect to the multiply or divide operation.

Arithmetic register (AR) 16*a* is a 16 bit register used to hold the first operand in arithmetic or logical microoperations. It is one of two direct inputs to the ALU 16. The other input to ALU 16 is the 16 bit bus 31 which receives data from any one of 29 possible sources. The two 8 bit bytes of bus 31 may also be swapped by means of cross shift logic 16*b*.

ALU 16 includes a 16 bit parallel adder-subtracter logic network 16*c* with a one-bit look ahead carry. The 16 bit arithmetic or logical result from network 16*c* is gated to S bus 30 which in turn is gated to one of thirty three possible designations.

Input-output transfer is accomplished by way of a single microinstruction contained in ROM 20. I/O control lines 24*a* are decoded from RD bits 14 and 15 in RD register 34. Input data is taken from data request lines (DRL 0–7) **24*b* and placed directly on bus 31 bits 8 – 15. Output data is taken from bus 30 bits 8–15 and loaded directly to the data available lines (DAL) 0–7 (24*c***).

GENERAL OPERATION OF PROCESSOR 10

Processor 10 is basically oriented toward the standard user's instruction set of Interdata Inc. Reference Manual publication no. 29-004 R01, copyright 1967. The user's instruction may cause many hardware and microprogram functions to be performed before actually entering the microroutine that will execute the instruction.

The instruction set is made up of three basic classes of instructions. The first class is defined as RR which means Register-tohRegister, the second class is RX which means register to indexed memory and the third class is RS which is a mixture of instruction forms. The major portion of this third class comprises immediate instructions. An immediate instruction is an instruction in which the address field is treated as the data instead of the address of the data.

Figure 2:
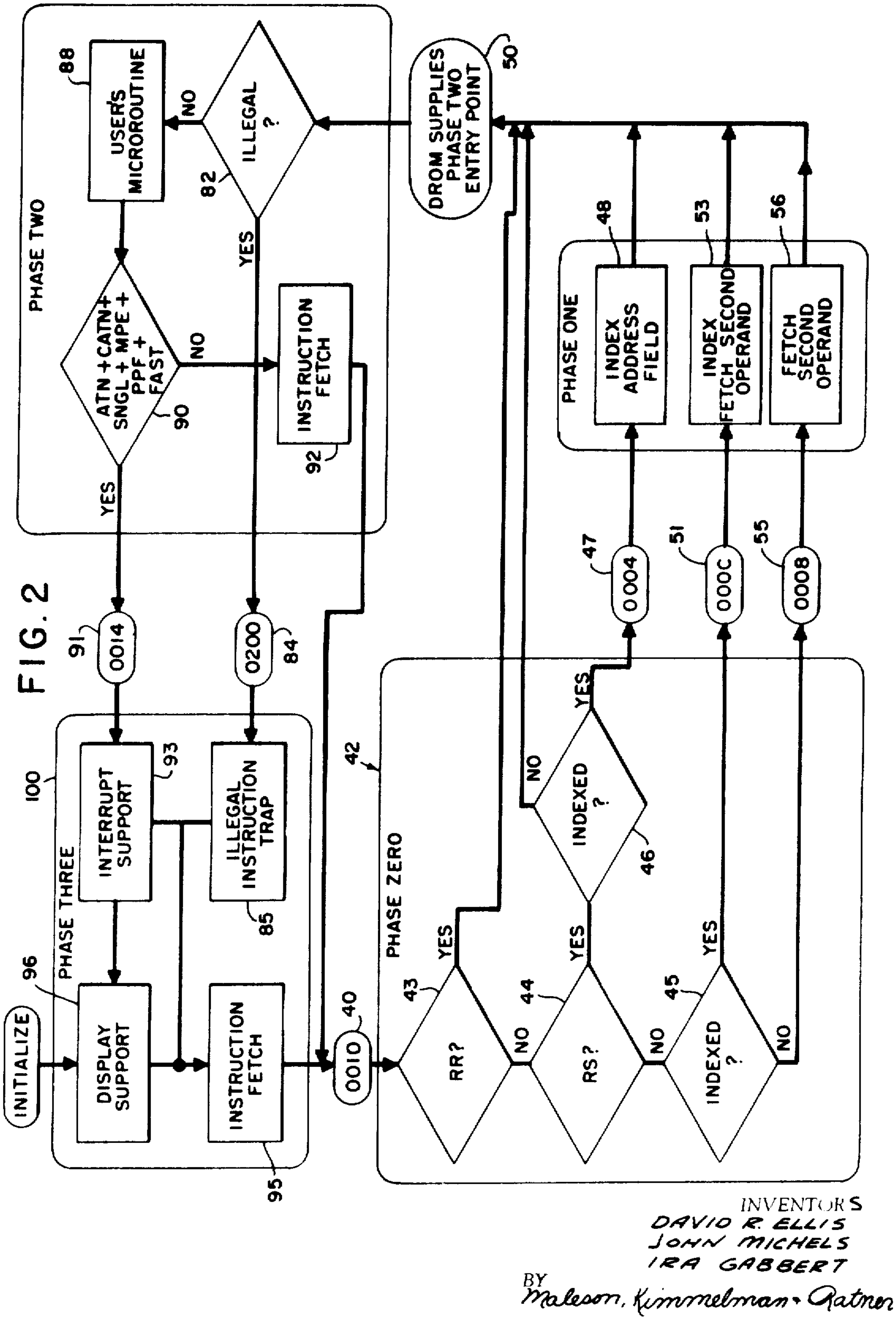
FIG. 2 illustrates a flow chart for the four phases of the processor of FIG. 1.

In processor 10 there are four hardware conditions known as "phases" as illustrated in FIG. 2. Each phase has corresponding sets of microinstructions. In general, phase zero is dedicated to users instruction fetch and class decoding. Phase one is dedicated to indexing for the second operand. Phase two is dedicated to user's instruction execution and phase three is dedicated to interrupt service and display support. These phases affect and in turn are affected only by the decode microinstruction. Upon microcode command, the appropriate next phase is entered. The phase entered is a function of the current phase and the other machine conditions.

FIG. 2 illustrates in general form a flow chart of the hardware and microprogram functions that are common to all user's instructions. A detailed computer listing of the entire basic microprogram will later be given.

A typical execution cycle of the user instruction will now be explained. User instruction execution begins when phase zero is entered.

Prior to entering phase zero a decode instruction exiting phase two or three caused core memory 25 to be read from the location specified by the location counter **15*h*. At the same time the location counter was incremented by two and address register 20*a* was forced to the starting address of the phase zero microinstruction sequence 40. The microinstructions at location 0010–0012 are used to place the OP code in the appropriate register for examination by the hardware. Specifically, the instruction register 17 is loaded from register 35 and register 25*a* is loaded from register 15*h*. In operation, if the format of the OP code placed in register 17 indicates that the instruction is RX or RS then terminate phase zero and fetch the second half of the instruction and at the same time increment the contents of register 15*h* by two. If the format of the OP code placed in register 17 indicates that the instruction is RR, then terminate phase zero and enter phase two. The foregoing is the general operation of phase zero block 42**.

More particularly, the decode instruction exiting phase zero makes the following hardware decisions. If the instruction OP code format is RR as determined by block 43, then exit block 43 and enter phase two. If the decision is "no", then exit block 43 and enter block 44. If the OP code is RS and is not indexed exit block 44 to block 46 and exit block 46 to phase two block 50. If the OP code is RS and has been indexed then go to phase one and to location 0004 in the microprogram to index the address field. After performing that index then exit to phase two block 50. If the OP code was not RR or RS then it must be RX so decision block 45 is entered. If indexed, then go to phase one and to address 000C in the microprogram (block 51) and index and fetch the second operand by block 53. Upon completion of this operation exit to block 50. If the OP code was RX and unindexed then go to phase one and to location 0008 in the microprogram and fetch the second operand in block 56. After that operation exit to block 50.

It will be understood that the operations performed by blocks 48, 53 and 56 are discrete instructions and can be seen at the respective addresses of blocks 47, 51 and 55 in the microprogram listing given later. The respective addresses were selected nowhere else but from the hardware by the decode instruction exiting phase zero.

A major function of digital computers is in the decoding of instructions and entry into the proper execution cycle of the processor. Usually this function has required a substantial amount of relatively expensive hardware or a time consuming logical manipulation of the OP code. In accordance with the invention an optimum cost performance ratio has been achieved by using read only memory techniques and a minimum number of logic components. In general the operation involves the fact that any time that phase two is entered either from phase zero or phase one, DROM 21 is interrogated. DROM 21 is addressed by the operation code (bits 0–7) of IR register 17. Each of the user's instructions has a unique 12 bit word that has previously been wired into DROM 21. This word is the starting address of the microroutine which will execute the specific user's instruction. The read out of DROM 21 is automatically jammed into ROM 20 address register **20*a***.

Figure 3:
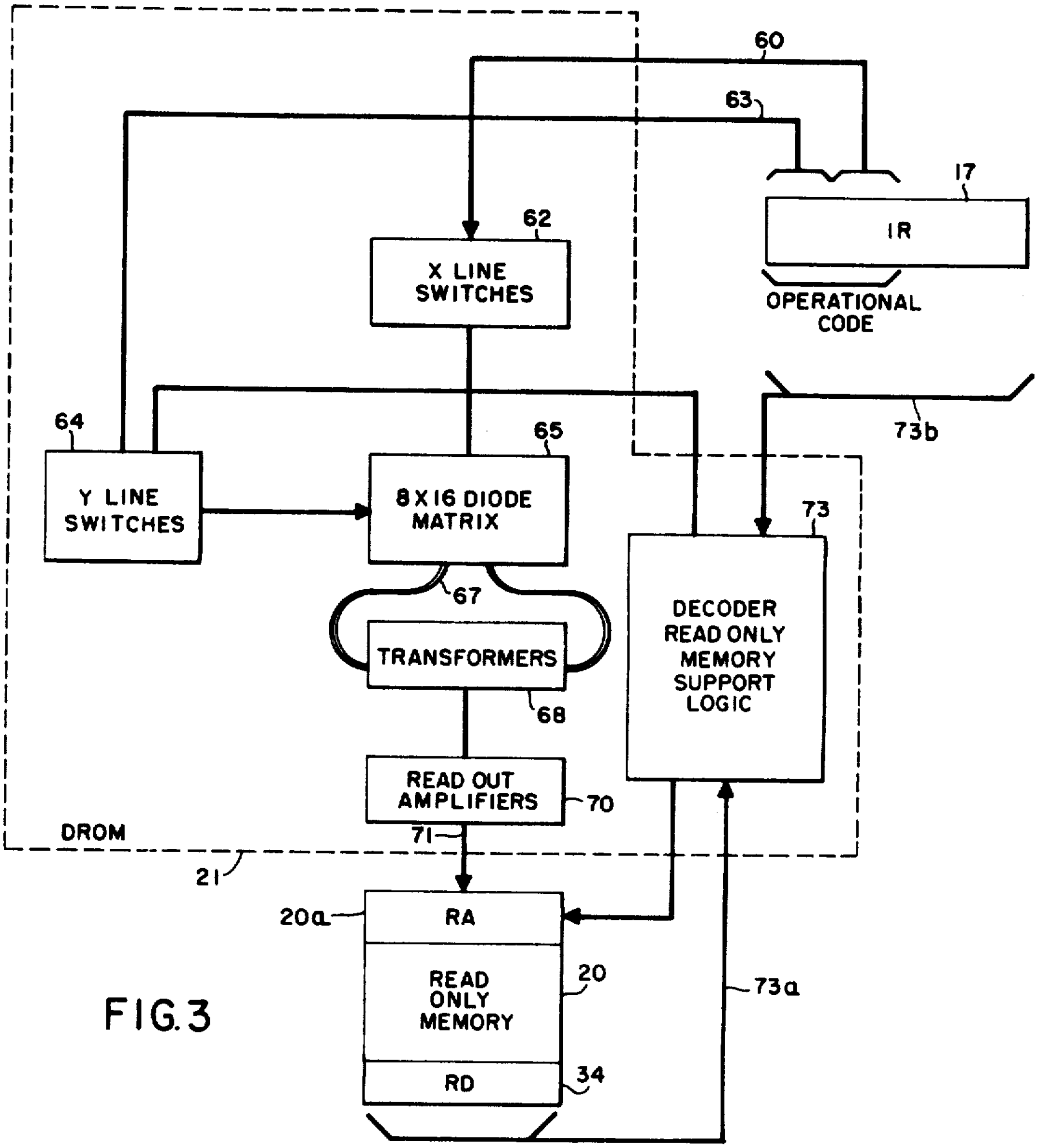
FIG. 3 illustrates in block diagram form more detail of the decode read only memory of FIG. 1.

The hardware associated with block 50, FIG. 2 is shown in more detail in FIG. 3. For logical explanation FIG. 3 will be described before completing the description through phase two and three of FIG. 2. It will be noted that some of the blocks of FIG. 3 are the same as in FIG. **1*a* though slightly changed in location and form for the purpose of description in FIG. 3. The bits of the OP code from register 17 are taken by way of lines 60 to gates 62 and by way of lines 63 to gates 64. In gates 62 the OP code is used to select one of 16 X-line switches and in gates 64 the OP code is used to select one of eight Y-line switches. Gates 62 and 64 are connected to an 8 by 16 diode matrix 65. Gate 64 provides a positive current pulse on one of the eight Y-lines and gate 62 provides a ground return on one of the 16 X-lines. Each Y-line terminates with 16 individual diodes in the matrix. Word lines 67, connected between a Y-line terminating diode and an X-line, are threaded through an array of 12 transformers 68. In this manner one of 128 possible word lines 67 is pulsed. Each of the legal user's instructions is associated with an individual one of the word lines 67 in DROM 21**. Accordingly, each of the word lines holds a starting address of a microroutine that will execute a specific user's instruction. Read only memories are well known in the art and are described in Development of an E-Core Read Only Memory, P.S. Sidhu, AFIPS Conference Proceedings, Vol. 27, Part 1, 1965 Fall Joint Computer Conference.

Word lines 67 are threaded through transformer 68 in a manner to provide a desired 12 bit starting address when a particular one of the word lines 67 is pulsed. The starting address generated by transformers 68, upon pulsing word lines 67, is applied by way of 12 read out amplifiers 70, one for each of transformers 68. After being amplified, the starting address is applied by way of lines 71 to RA register **20*a*. In this manner, the data read out from the pulsed word line 67 is applied as an address to register 20*a*. Thus, in accordance with the invention, the address of the user's instruction microroutine has now been placed in register 20*a* that will execute the desired user's instruction placed in IR register 17**.

It will now be understood in accordance with the invention the housekeeping and instruction decoding work of the processor which had previously decreased the speed of the processor for specific user's instruction sets has been substantially decreased. In addition, it is now simple and inexpensive to add additional user's instructions to the user's instruction set. Specifically, for each new instruction, a microroutine is wired into ROM 20 and the starting address of that microroutine is wired into DROM 21 by adding a word line between a terminating Y-line diode and an X-line. The word line is threaded through transformer 68 in a manner to cause the 12 bit starting address to be read out. This starting address is wired at the location whose address is the OP code of the new instruction.

Logic block 73 comprising a plurality of gates and flip-flops contains many of the logic decisions described with respect to phase zero, block 42, FIG. 2. In addition, block 73 provides the proper sequence of signals to obtain DROM read out 71 into register 20a by way of a clear line 74 followed in time by an enable signal on enable line 75. Detailed explanation of a typical logic block 73 performing the functions listed herein is detailed in R. Threadgold et al., U.S. Pat. No. 3,404,378 entitled "Computers".

The output buffer for ROM 20 is provided by RD register 34. Bits 0–3 are applied by way of lines 73*a* to logic block 73 and indicate that register 34 contains a decode instruction. In addition bits 12–15 are applied by way of line 73*a* to block 73 and define the extended operation field. With the foregoing information from lines 73*a*, block 73 also receives information from IR register 17 by way of lines 73*b*. Bits 0–3 of IR register 17 indicate what class of user's instruction is held in the IR. Bits 12–15 indicate whether or not the instruction has been indexed.

Now that the hardware associated with block 50 has been explained with respect to FIG. 3, the description will now return to FIG. 2 where it will be remembered that the phase two entry point 50 is derived from DROM 21. As previously described, DROM 21 may have up to 128 bit words wired into it and the words are addressed by the user's instruction of IR 17. DRO, 21 has a word line for each instruction in the user's instruction set. Enabling DROM 21 causes the selected word line to be pulsed during the phase zero or phase one decode instruction and bit zero of DROM 21 is ANDED with bit 7 of the PSW. If the result is not true, the read out provides a starting address of a phase 2 microroutine which is placed into RA register 20*a*. If the result is true, the read out is set to zero and the instruction is read as illegal. This provides for privileged instructions under control of bit 7 of the PSW.

Instructions not in the user's instruction set are illegal and will not have a corresponding word line in DROM 21. When phase two is entered and a nonexistent DROM word line is pulsed, the read out, all zero's, is placed in register 20*a*. Location zero (0000) in ROM 20 is wired with all zero's (0000). When ROM address 0000 is read the contents are placed in RD register 34. All zero's in RD register 34 is defined as "illegal" and results in an unconditional phase three as shown by decision block 82. Thus, ROM address is forced to block 84 having address 0200 which is the entry point of the illegal instruction trap microroutine.

If the user's instruction is not illegal then user's subroutine block 88 is entered. There may be as many blocks 88 as there are user's instructions in the user's instruction set. One of these instruction sets, which will later be described in detail with reference to FIG. 4, is multiply and divide. Thus at this time the user's instruction subroutine is performed.

Regardless of the particular subroutine performed, the functions done by the decode instructions exiting block 88 are identical. Specifically, when phase two is exited at block 90 the decode microinstruction tests for interrupts. If any interrupt other than an external attention signal is true, phase three will be entered and the ROM address register 20*a* is loaded with address 0014, block 91. If no interrupts are pending, block 92 is entered to fetch the next user's instruction from core 25. At the same time, phase zero is entered and the ROM address in register 20*a* is loaded with address 0010, block 40. In this manner, there is provided means for returning to decode and execute the next user's instruction from the main core memory 25.

In phase three, block 100, microroutine sets are dedicated to display and interrupt support. The entry points to block 100 and 0014, block 91 and 0200, block 84. Block 85 results in a program status word swap after which block 93 is entered. Block 93 services any interrupt present. After successfully servicing any interrupt, block 93 is exited and block 96 is entered which examines the status of the display panel. If no operator interrupts are pending, then enter block 95 and execute the decode instruction which fetches the next user's instruction from core memory 25 thereby to enter phase zero, block 40.

Figure 5A:
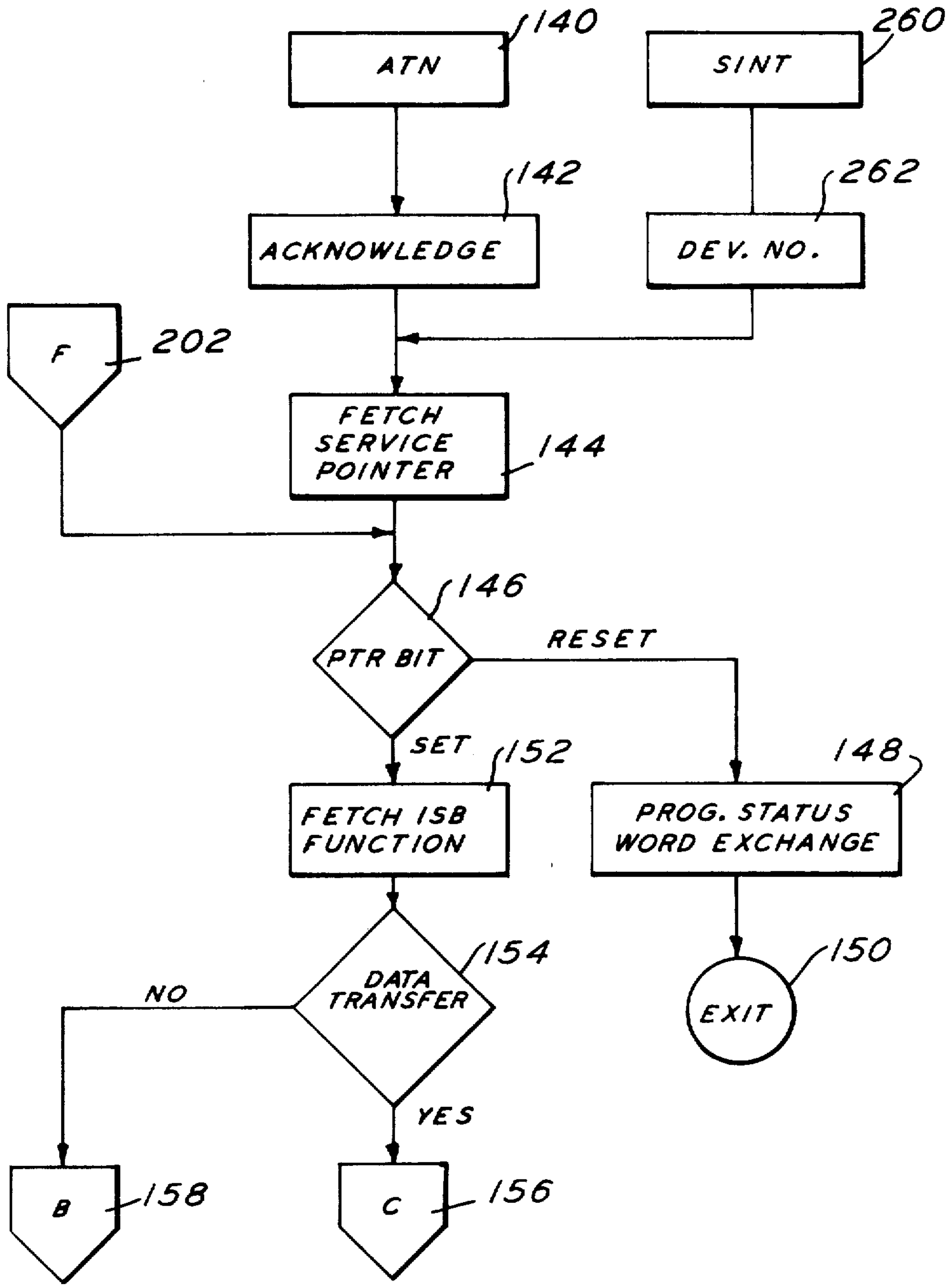
FIG. 5A shows in block diagram form the activate sequence through which an interrupt signal is sent through a simulated device or from some external devices.

If an interrupt instruction is given by an external attention signal then the special microroutine of FIGS. 5A – 5D is entered. Referring to FIG. 5A where an external attention signal, block 140 intervenes, processor 10 enters the microroutine to service attention signal block 140. In the microroutine block 142 acknowledges the interrupt instruction. In like manner, the system may be tested by itself under program control where the system may simulate the occurrence of an interrupt signal being sent by an external device. Processor 10 sends a signal to block 260 which is a simulated interrupt signal. Exiting block 260, block 262 is entered where a device number is produced. The microroutine then enters the program directly after the program acknowledge block 142. A device number must be defined to identify an information path to direct the microroutine instructions. Once acknowledged, block 144 is entered to fetch a service pointer from a service pointer table located in core memory 25. Block 146 acknowledges the interrupt and based on the address received back from the external device, indexes through the service pointer table located in core memory 25. Block 146 inspects the value for the external device in the service pointer table and if this value is even block 146 is exited and the program enters block 148 where the routine does an immediate program status word exchange at the location indicated by the value in the service pointer table and exits to block 150. The program flows from block 146 to block 148 and finally exits at block 150 defined as the immediate interrupt. This mechanism allows for the use of 256 unique locations for exchanging program status words and identifying particular devices.

Figure 4A:
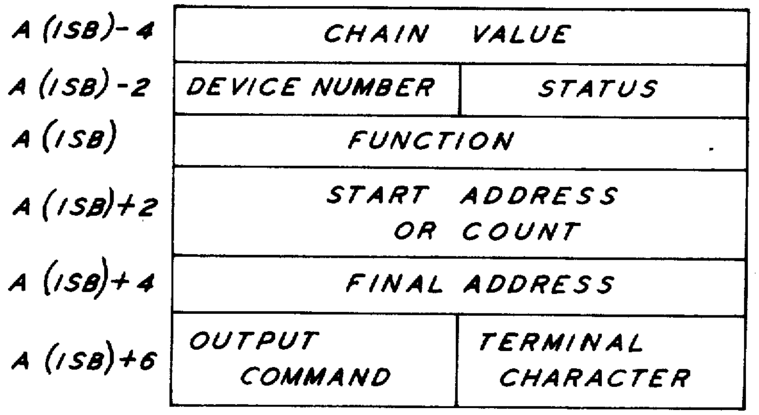
FIGS. 4A – B taken together illustrate in block diagram form the interrupt service block and interrupt service block function codes.
Figure 4B:
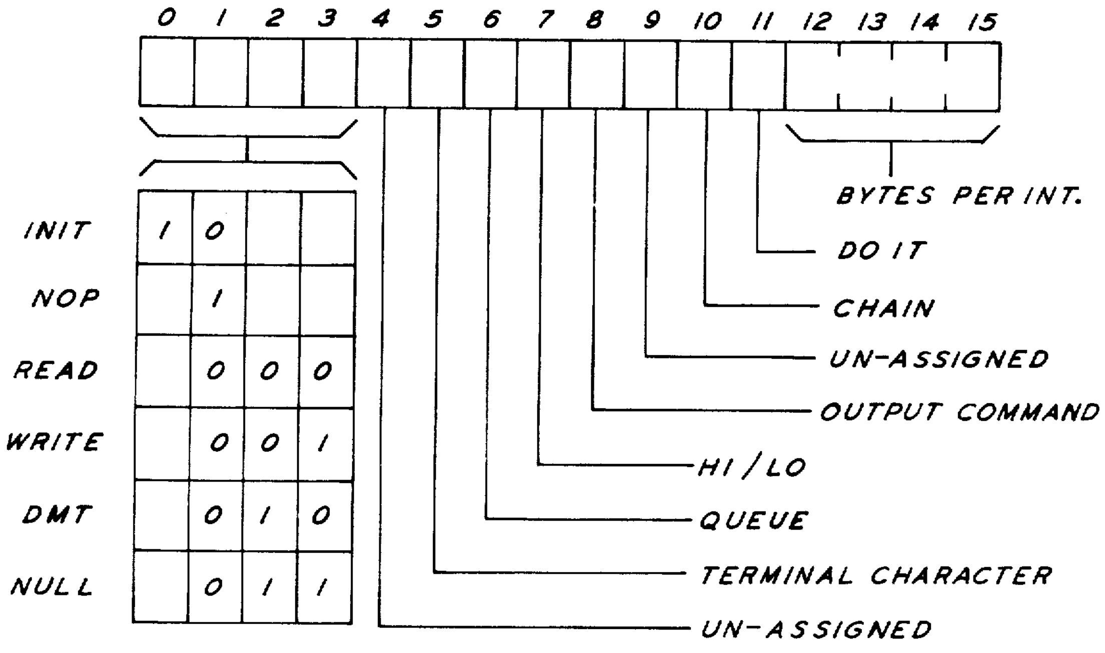
Figure 5C:
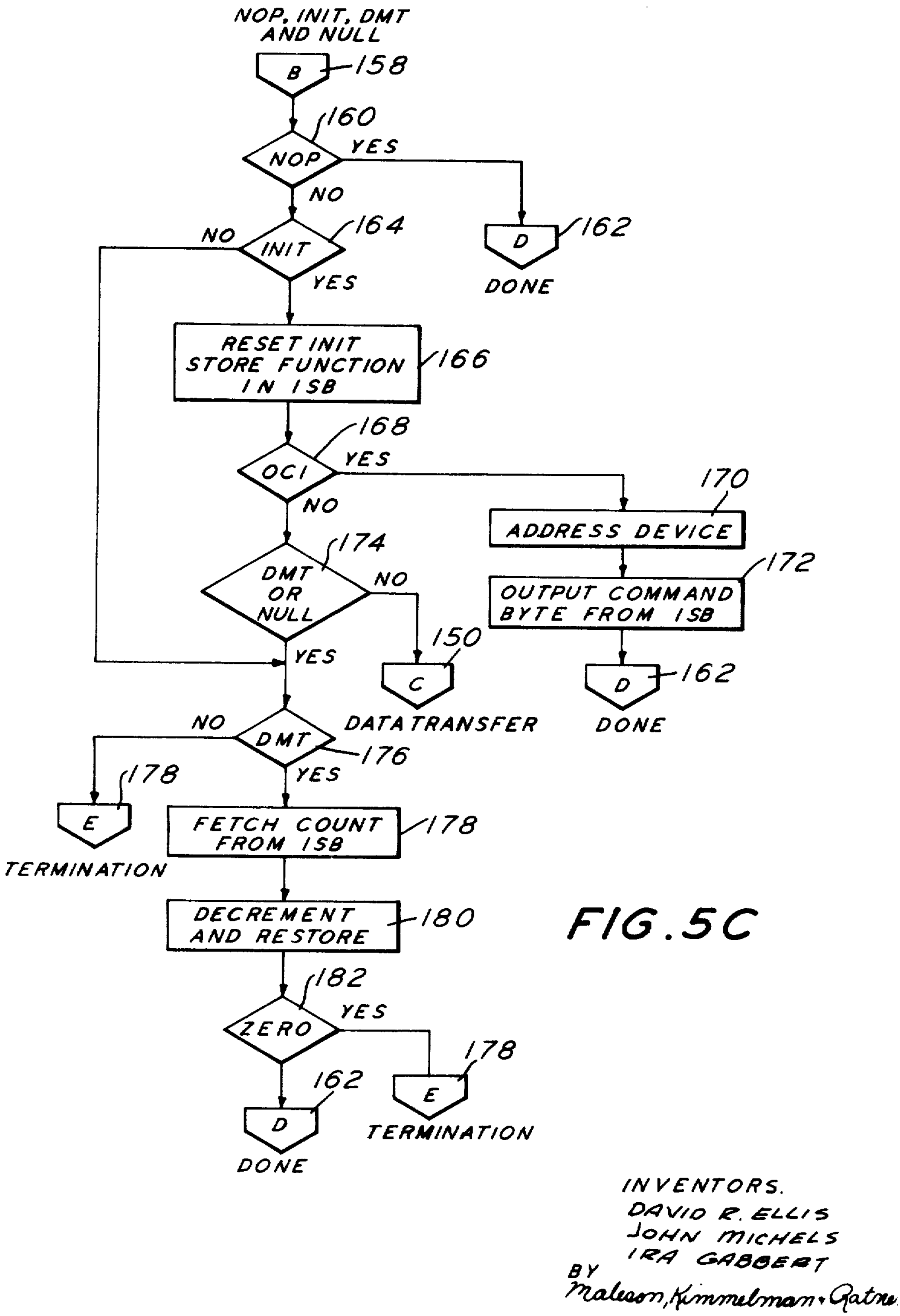
FIG. 5C illustrates in block diagram form the sequence detailing the ability to count interrupts for pulse counting operations.

If the value fetched to block 146 from the service pointer table is odd, the routine exits block 146 and enters block 152 to pick up an interrupt service block function from the location indicated by the service pointer table. Exiting block 152, block 154 is entered to determine whether or not the interrupt service block function shown in FIGS. 4A – B is a data transfer. Where the function is found to be a data transfer block 154 is exited and block 156 is entered wherein the path of FIG. 5B is followed. Where the function is found not to be a data transfer, block 158 is entered from block 154 and the path of FIG. 5C is followed.

Where the function code indicates a data transfer in reference to FIG. 5B, the signal passes from block 150 indicating a data transfer to block 220 where the microroutine loads two of its registers with the current address and final address from the ISB, FIGS. 4A – B. Once the registers are loaded block 222 is entered where the byte count is set from the function, in sequence the external device is addressed and status received in block 224. The status is checked in block 226 and when it is found acceptable, block 228 is entered to determine whether a read or write instruction has been sent. Assuming a read instruction exists, then within block 230, the data is read and stored in the current address, the current address is incremented and the byte count is decremented.

If the byte count does not equal zero as checked in block 234, the microroutine is diverted back to block 230 to continue the read data function and decrement the byte count until it does equate to zero as verified in block 234. If the byte count does equal zero, then the current address is stored in the ISB as shown in block 246.

The microroutine then enters block 248 where the current address is compared with the final address. Where the current address is less than or equal to the final address, the flow path goes to block 250 where a check is made to determine whether the terminal character bit is set. If the terminal character bit is not set, then the microroutine goes to the DONE phase as shown by block 162. If the terminal character bit is set then block 252 is entered where the terminal character is fetched from the ISB. The terminal character is then compared with the last character and if they are not equal, then the microroutine goes to the DONE phase represented by block 162.

Where the terminal character is equal to the last character as compared in block 254 or where the current address is greater than the final address in block 248, then the microroutine sets the function to a no operation as shown in block 240. The function is then stored in the ISB upon entering block 242. The microroutine exits block 242 and enters block 244 where the device number status is stored in the ISB. From this the microroutine goes to the termination phase as represented by block 178.

In similar fashion, where a write instruction has been sent and checked in block 228, the microroutine is then diverted to block 232 where data is written from the current address, the current address is incremented and the byte count is decremented. Within block 236, the byte count is analyzed to determine whether it is zero. When the byte count is not equal to zero, the microroutine reenters block 232 and continues to decrement the byte count until it is zero as analyzed within block 236. Once the byte count is zero, the microroutine then follows the identical path as described in the preceding paragraph with respect to the read instruction.

Returning to block 226 where the status is checked, if the status check is found not to be acceptable, then the microroutine enters block 238 where the initialized bit, the no operation bit, and the "Q" bit, which is the bit in the termination phase determining whether or not an entry is made, are set and finally the chain bit is reset. The microroutine then enters block 240 to set the function to a no operation state and follows to termination block 178 in exactly the same manner as would be found if the status check in block 226 was acceptable.

Referring to FIG. 5C where the function is determined to be a non-data transfer, the signal enters block 158 from FIG. 5A and exits to the NOP block 160 where NOP bit is either set or not. Where the indicated function is a no operation, the signal leaves block 160 and enters block 162 where the microroutine starts or continues at the next instruction as specified by the PSW. Where the NOP bit is not set, upon exiting from block 160, the signal enters block 164 where the initialize bit is either reset or not. If an initialized function is indicated, in block 164, the microroutine resets the initialized indicator within block 166 and enters block 168 to check for the output command 1. If the output command 1 is set in block 168, the microroutine signal enters address block 170 where the device is addressed and outputs the command byte from the ISB in block 172. The signal then exits to the DONE phase block 162 as indicated on FIG. 5D. If the output command within block 168 is not set, the microroutine enters block 174 to check for decrement memory and test or NULL.

Bits 2 and 3 of the function code indicate the decrement memory and test (DMT). In this operation, the count field of the ISB is decremented by one for each interrupt signal. Where the count goes to zero, the termination phase is entered. In addition, if bits 2 and 3 of the function code are both set, such indicates the NULL function wherein the termination phase is entered. If neither of those is set, the microroutine exits to C block 156 on FIG. 5B. The signal enters block 176 to check DMT. If no DMT, the bit is set and the microroutine enters termination block 178. If the function indicates a decrement memory and test found in block 176, the microroutine enters block 179 to fetch the count from the ISB, exits block 179 and enters block 180 to decrement the count by one and restore it. Block 182 checks the count and if the count is equal to zero, the program exits to the termination phase E block 178 on FIG. 5D. Where block 162 indicates a nonzero count, the program exits to the DONE phase D block 162 in FIG. 5D.

Where the initialize bit is not reset in block 164 the signal bypasses blocks 166, 168 and 174, reentering the program at the DMT block 176 and carries through the remaining instructions as described in the preceding paragraphs. It is not a decrement memory and test; it has to be a NULL and the microroutine exits to the termination phase E on FIG. 5D. The decrement memory and test function gives one the ability to count interrupts for post current operation.

Figure 5D:
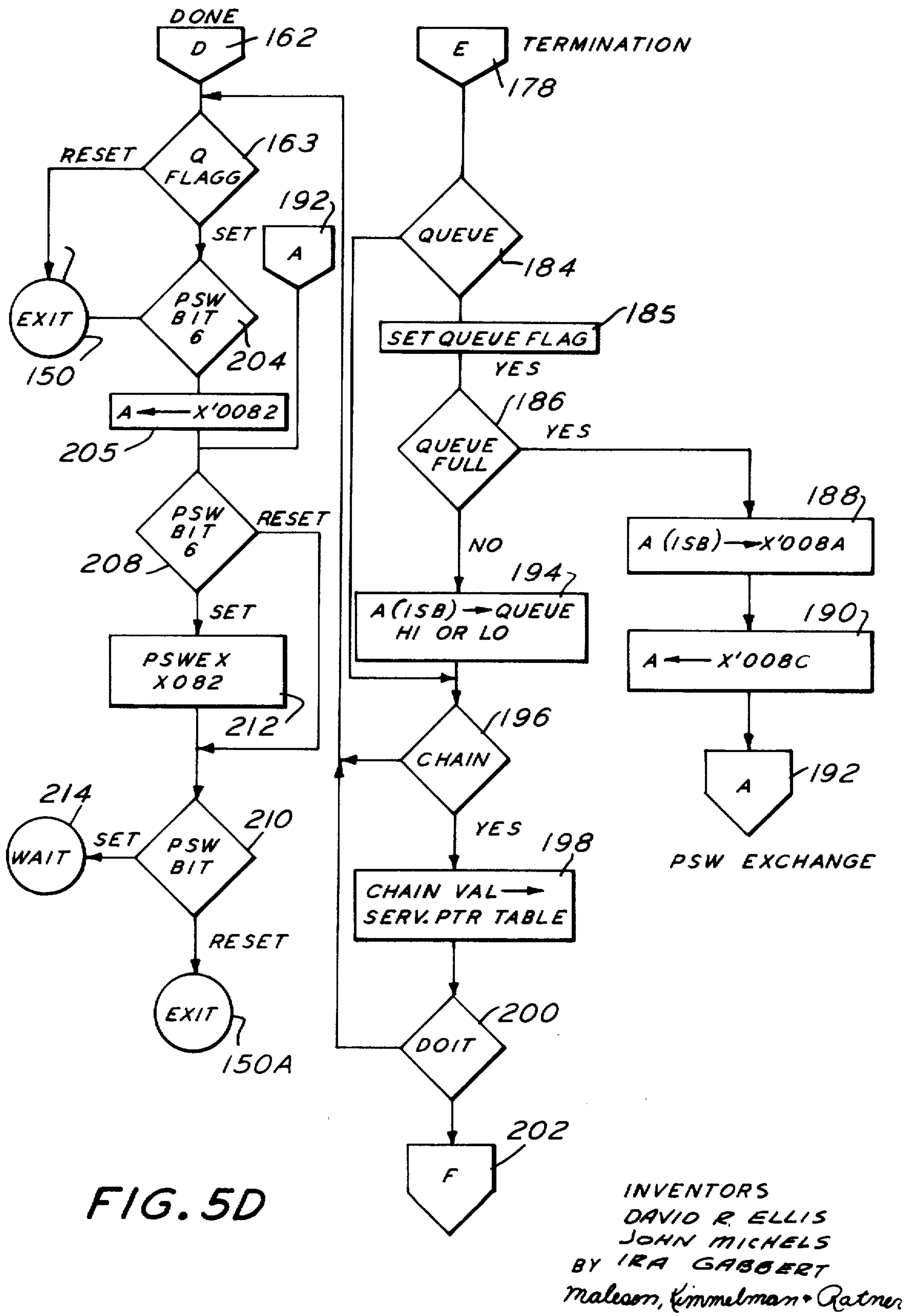
FIG. 5D illustrates in block diagram form the termination and done sequences for the external device interrupt signals.

Referring now to the termination phase entrance at block 178 of FIG. 5D, the microroutine checks the queue bit in the function code of the ISB in block 184. If the queue bit is set within block 184, it sets a flag for reference in the DONE phase and the signal is directed to block 186 where the queue in the core is determined. If the queue is full, block 188 is entered where the address of the ISB is put into location 8A and loads a new PSW from location 8C in block 190 finally performing a PSW exchange indicated by block 192. If the queue is not full as checked in block 186, the address of the ISB is put in the queue at block 194. The chain bit is then analyzed upon entering block 196. If the chain bit is set, the chain value from the ISB is put in the service pointer table at the location specified for this device, at block 198. The DOIT bit is then analyzed from the function code in block 200. When the DOIT bit is set, the microroutine is reentered through block 202 as shown in FIGS. 5A and 5D. As shown in FIG. 5A, the reenter phase is input to the program between blocks 144 and 146. This allows the generation of an immediate interrupt on termination of an IO transfer. Or it can allow the starting of another IO transfer to the same device using a new interrupt service block. In this manner, time saving is achieved due to the fact that it is not necessary to go into software to obtain another IO transfer.

If the chaining bit, block 196, is not set or the DOIT bit, block 200, is not set, then the DONE phase, block 162 in FIG. 5D is entered. On entering the DONE phase, the microroutine checks the queue flag in block 163. If this is reset, it is directed to exit block 150. If the queue flag is set, the microroutine is directed to block 204 where a check on bit 6 of the PSW is made. If it is reset, the microroutine is directed to exit block 150 where before execution of the next instruction, a check is made for an external interrupt signal. If an external interrupt signal is present, the microroutine services it before execution of the next instruction.

Where bit 6 of the PSW is set in block 204, the A register is set to X'0082 as shown in block 205, a PSW exchange is then completed in block 206. If the PSW at this point has bit 6 reset in block 208, then the microroutine enters block 210 where it exits at block 150A. Where PSW has bit 6 set the queue is checked for entries. If there are any entries, the microroutine is directed to block 212. If there are no entries in the queue, the microroutine checks PSW bit zero in block 210. If this is set, it enters the wait state, block 214. If this is reset, the microroutine exits to phase zero block 150A.

There are two major advantages to this microroutine. The first of these is related to the immediate interrupt which gives the user the ability to have up to 256 unique call locations, one per device and eliminates the need for identifying the device that is causing the interrupt. The second of these is derived from the interrupt service block mechanism in which data can be transferred and pulses counted in a background mode without interrupting the currently running program. All of the microroutine is executed in between the execution of normal user instructions. It allows real time programs to be interrogated without interrupting the real time program. The external attention can be simulated from a device that is not tied into this system at the time.

The system may be tested under program control by the processor. Where such a simulated interrupt does not exist, any array of peripheral equipment attached to the computer would be required to generate signals in order to test the program. The simulate interrupt feature of the microroutine further allows the user to simulate an interrupt which will cause the program to take specific action. In specific, where the operator wishes the program to follow a certain path in the program flow chart, a simulate interrupt signal may be sent to the microroutine which will allow the needed path to be followed.

There now follows a series of microprogram listings which show location addresses and internal logic for the flow diagram description presented in FIGS. 5A–5D and discussed in the foregoing paragraphs.

```
*
* READ BLOCK-WRITE BLOCK
0400  3020  WRR      C  SUT                   SIGNIFIES WRITE BLOCK.
0401  5004  RWBRR    L  RAH, H (RWHRR)        COMMON RR ENTRY.
0402  44E3           L  MR4, YS               BUFF STARTING ADRS.
0403  4593           L  MAR, IR               SAVE IR.
0404  4998           L  IR, IR, SL+NC         GATE YS FIELD TO YD FIELD.
0405  4998           L  IR, IR, SL+NC
0406  4998           L  IR, IR, SL+NC
0407  4998           L  IR, IR, SL+NC
0408  5810           L  AR, X'IO'             YD INCREMENT.
0409  0994           A  IR, IR, NC            ADDRESS YD+1.
040A  4440           L  MR4, MR4, NC          NO OP.
040B  4AE3           L  MDR, YD               ENDING ADRS TO MDR.
040C  4953           L  IR, MAR               RESTORE IR.
040D  5114           L  RAL, L(COMBK)         EXIT TO COMMON.
040E  3020  WB       C  SUT                   SIGNIFIES WRITE BLOCK.
040F  5004  RWBRX    L  RAH, H(RWBRX)         SET PAGE.
0410  5802           L  AR, X'2'              INCREMENT.
0411  44A3           L  MR4, MDR              STARTING ADRS OF BUFF TO MR4.
0412  0554           A  MAR, MAR, NC          FETCH ENDING ADRS.
0413  3100           C  MR
0414  5B00  COMBR    L  FLR, X'O'             CLEAR FLAGS.
0415  4840           L  AR, MR4, NC           STARTING ADRS TO AR.
0416  4540           L  MAR, MR4, NC          SAVE STARTING ADRS OF BUFF.
0417  E4A5           S  MR4, MDR, CO          START ADRS-END ADRS TO MR4.
0418  1232           B  G, FINIS
0419  4DE1  OK       L  IO, YD, ADRS          ADDRESS DEVICE.
041A  5801           L  AR, X'1'              BYTE INCREMENT.
041B  2040           T  UT                    TEST U FLOP, BRANCH IF RESET.
041C  1128           B  L, STATRB             READ BLOCK LOOP.
041D  3100  LOOPW    C  MR                    READ DATA.
041E  4BD3  STATWB   L  FLR, IO, STAT         FETCH DEVICE STATUS?
041F  1F30           B  CVGL, TEST2           BRANCH IF ANY BITS SET.
0420  4DAE           L  IO, MDR, DA+CS        GATE PROPER BYTE OUT.
0421  C444           A  MR4, MR4, NC          DECREMENT DIFF, FIR=0.
0422  1232           B  G, FINIS              BRANCH IF POSITIVE.
0423  C554           A  MAR, MAR, NC          INCREMENT BUFF ADRS.
0424  511D           L  RAL, L(LOOPW)         BRANCH TO LOOP WRITE.
0425  C444  LOOPR    A  MR4, MR4, NC          DECREMENT DIFF, FLR=0.
0426  1232           B  G, FINIS              BRANCH IF POSITIVE.
0427  C554           A  MAR, MAR, NC          INCREMENT BUFF ADRS.
0428  3100  STATRB   C  MR
0429  4BD3  STATR1   L  FLR, IO, STAT         DEVICE STATUS TO FLAG REG.
042A  1F2E           B  CVGL, TEST1R          DETERMINE UNUSAL STATUS.
042B  4ADE           L  MDR, IO, DR+CS        GATE DATA TO CORRECT BYTE.
042C  3200           C  MW                    COPY.
042D  5125           L  RAL, L(LOOPR)         BRANCH TO LOOP READ.
042E  1733  TEST1R   B  VGL, FIN              UNUSAL STATUS, EXIT.
042F  5129           L  RAL, L(STATR1)
0430  1733  TEST2    B  VGL, FIN              UNUSAL STATUS, EXIT.
0431  511E           L  RAL, L(STATWB)
0432  5800  FINIS    L  FLR, X'O'             CLEAR FLAGS.
0433  4560  FIN      L  MAR, LOC, NC
0434  066F           D  LOC, LOC, P2J
            * MULTIPLY
0435  4AE3  RRMULT   L  MDR, YS               FETCH RR MULTIPLICAND.
0436  5004  RXMULT   L  RAH, H(RXMULT)        SET PAGE.
0437  68AC           O  AR, MDR, NA+NC        TEST MULTIPLICAND NEG.
0438  123B           B  G, NOCMP              IF POS DO NOT COMPLIMENT.
0439  E8AC           S  AR, MDR, NA+NC        2'S COMPLIMENT OF MULTIPLICAND.
043A  3020           C  SUT                   SET U FLOP, DENOTE NEG CAN.
043B  6FFF  NOCMP    O  YDPI, YDPI, NA        TEST IF MULTIPLIER NEG.
043C  123F           B  G, STMM               IF POS DO NOT COMPLIMENT.
043D  EFFC           S  YDPI, YDPI, NA+NC     2'S COMPLIMENT OF MULTIPLIER.
043E  3030           C  TUT                   TRIGGER U FLOP FOR SIGN PROD.
043F  5800  STMM     L  FLR, X'O'             CLEAR FLAG REG.
0440  5E00           L  YD, X'O'              CLEAR MSH OF PRODUCT.
0441  3400           C  MPY                   MULTIPLY MODE.
0442  4EE7           L  YD, YD, SR            SHIFT PLIER RIGHT.
            * L YDPI, YDPI, SR HIDDEN INSTRUCTION, IMPLIED BY MPY MOD
0443  CEE5           A  YD, YD, CO            ADD CAND TO PARTIAL PRODUCT.
0444  4EE5           L  YD, YD, SR+CO         CORRECT PRODUCT BY SHIFTING.
0445  4FF6           L  YDPI, YDPI, CI+SR     RIGHT ONCE.
0446  2040           T  UT                    TEST IF PRODUCT SHOULD BE NEG.
0447  114A           B  L, OKMPY
0448  EFFD           S  YDPI, YDPI, NA+CO     2'S COMPLIMENT OF DOUBLE.
0449  EEEE           S  YD, YD, NA+CI         LENGTH PRODUCT.
044A  4568  OKMPY    L  MAR, LOC              NORMAL EXIT.
044B  066B           D  LOC, LOC, P2N
            * FIXED POINT DIVIDE
            *
            *
            * RR ENTRY
044C  4AE3  DIVRR    L  MDR, YS               LOAD DIVISOR.
            * RX ENTRY
044D  5004  DIVRX    L  RAH, H(DIVRX)         SET PAGE.
044E  68AF           O  AR, MDR, NA           CHECK DIVISOR.
044F  3020           C  SUT                   ANTICIPATE NEGATIVE.
0450  1155           B  L, OKDIV              DIVISOR IS NEGATIVE.
0451  1253           B  G, COMSOR             MAKE NEGATIVE.
            * DIVISION BY ZERO ILLEGAL
0452  5171           L  RAL, L(OVFL)          OVERFLOW.
            *
0453  E8AF  COMSOR   S  AR, MDR, NA           2'S COMP DIVISOR.
0454  3010           C  CUT                   DIVISOR WAS POSITIVE.
0455  43F3  OKDIV    L  MR3, YDPI             SAVE LO DIVIDEND.
0456  64EE           O  MR4, YD, NA           TEST AND SAVE HI DEND.
0457  125B           B  G, BCKDIV             DIVIDEND POSITIVE.
0458  3030           C  TUT                   COMP RESULT SIGN.
0459  EFFO           S  YDPI, YDPI, NA+CO     2'S COMP DIVIDEND.
045A  EEEE           S  YD, YD, NA+CI
            *
045B  C5E5  BCKDIV   A  MAR, YD, CO           TRIAL SUBTRACT.
045C  186F           B  C, OVDIV              OVERFLOW.
            *
045D  3800           C  DIV                   DIVIDE MODE.
```

```
                 *L YDP1, YDP1, SL SHIFT QUOT (IMPLIED)
045E  4EEB                 L   YD, YD, SL             SHIFT PARTIAL REMAINDER.
045F  0EE5                 A   YD, YD, CO             RESTORE IF ADD CARRYS.
                 *
0460  4FFB                 L   YPD1, YDP1, SL         FINAL QUOT SHIFT.
0461  6FFC                 O   LYDP1, YDP1, NA+NC     TEST QUOT SIGN.
0462  116B                 B   L, STEST               MAY BE OVERFLOW.
0463  2040                 T   UT                     UT SET FOR NEG. QUOT.
0464  1166                 B   L, BCKCP
0465  EFFC                 S   YDP1, YDP1, NA+NC      2'S COMP QUOT.
0466  644C       BCKCP     O   MR4, MR4, NA+NC        CHECK DIVIDEND SIGN.
0467  1269                 B   G, EXDIV               REM SN EQUAL DEND SN.
0468  EEEC                 S   YD, YD, NA+NC          2'S COMP REMAINDER.
0469  4563       EXDIV     L   MAR, LOC               ADRS NEXT INSTR.
046A  066B                 D   LOC, LOC, P2N          EXIT.
                 *
046B  2040       STEST     T   UT                     SHOULD QUOT BE NEG?
046C  116F                 B   L, OVDIV               IF NOT, OVERFLOW.
046D  EFFC                 S   YDP1, YDP1. NA+NC      2'S COMP.
046E  1166                 B   L, BCKCP               QUOT -2**15 OK.
                 *IF GREATER, OVERFLOW
046F  4F33       OVDIV     L   YDP1, MR3              RESTORE FIRST OP.
0470  4F43                 L   YD, MR4
0471  5000       OVFL      L   RAH, H(DIVPSW)
0472  519E                 L   RAL, L(DIVPSW)
                 *DIVIDE FAULT INTERRUPT IF ENABLED BY PSW 03
                 *
                 *
                 *FLOATING POINT EXPANSION
                 *
                 *
0473  3020       FSUBRR    C   SUT
0474  489B       COMFRR    L   AR, IR, SL             COMMON RR ENTRY.
0475  951C                 N   MAR, X'1C'             ADRS OF SECOND OP.
0476  3100                 C   MR
0477  5004                 L   RAH, H(COMFRX)
0478  517A                 L   RAL, L(COMFRX)
                 *
0479  3020       FSUBRX    C   SUT
047A  5004       COMFRX    L   RAH, H(BREAK)          SET PAGE.
047B  43A3                 L   MR3, MDR               HI SECOND OP.
047C  5802                 L   AR, X'2'
047D  C554                 A   MAR, MAR, NC
047E  3180                 C   MR+SB
047F  44A3                 L   MR4, MDR               LO SECOND OP.
0480  F822                 S   AR, X'22'              X'FFE0'
0481  8897                 N   IR, IR                 YD FORCED EVEN.
0482  45B8                 L   MAR, IR4, SL+NC
0483  3100                 C   MR
0484  5802                 L   AR, X'2'
0485  41A3                 L   MR1, MDR               HI FIRST OP.
0486  C554                 A   MAR, MAR, NC
0487  3100                 C   MR
0488  4833                 L   AR, MR3                HI SECOND OP.
0489  42A3                 L   MR2, MDR               LO FIRST OP.
048A  A817                 X   AR, MR1                SIGN A=SIGN B?
048B  1280                 B   G, BREAK               SIGNS ALIKE.
048C  3030                 C   TUT                    SIGNS DIFFER.
048D  489C       BREAK     L   FLR, IR, CS,+NC
048E  1490                 B   V, BRK1                MULTIPLY OR DIVIDE.
048F  1294                 B   G, GO                  ADD OR SUBTRACT.
0490  3040       BRK1      C   CB
0491  5005                 L   RAH, H(FCOMP)
0492  1400                 H   V, FMPDV
0493  51DA                 L   RAL, L(FCOMP)          COMPARE.
                 *
                 *
                 *FLOATING POINT ADD AND SUBTRACT
                 *UT SET IF DIFFERENCE TO BE TAKEN
                 *
0494  4038       GO        L   MR0, MR3, SL+NC        HI SECOND OP SIGN OUT.
0495  4823                 L   AR, MR2
0496  5B00                     FLR, X', 0'
0497  E847                 S   AR, MR4                COMPARE MAGNITUDES.
0498  4818                 L   AR, MR1, SL+NC
0499  E807                 S   AR, MR0
049A  18F7                 B   C, BGTRA               B GREATER THAN A.
                 *
                 *A EQUAL TO OR LESS THAN B
                 *SWAP REGISTERS SO MR3, 4 GREATER THAN MR1, 2
                 *
049B  4033       AGTRB     L   MR0, MR3
049C  4313                 L   MR3, MR1
049D  4103                 L   MR1, MR0
049E  4023                 L   MR0, MR2
049F  4243                 L   MR2, MR4
04A0  4403                 L   MR4, MR0
                 *
                 *
04A1  4897       CONT      L   AR, IR, SR
04A2  9970                 N   IR, X'70'              YD FIELD ONLY.
04A3  4039                 L   MR0, MR3, SL+CO        2X RESULT EXPONEN.
04A4  499B                 L   IR, IR, SL             RESULT SIGN TO IRIS.
04A5  5SFE                 L   MAR, X'FE'
04A6  488F                 L   AR, MAR, CS            X'FEDO'.
04A7  8807                 N   AR, MR0                JUST THE RESULT EXPONENT.
04A8  6997                 O   IR, IR                 SAVE IN IR.
                 *
04A9  481F                 L   AR, MR1, CS            LOW EXPONENT.
04AA  9A7F                 N   MDR, X'7F'
04AB  483F                 L   AR, MR3, CS            HI EXPONENT.
04AC  987F                 N   AR, X'7F'
04AD  5B00                 L   FLR, X'0'
04AE  EAA4                 S   MDR, MDR, NC           DIFFERENCE.
04AF  58FF                 L   AR, X'FF'
04B0  8113                 N   MR1, MR1, NF           REMOVE EXPONENT.
04B1  8333                 N   MR3, MR3, NF           REMOVE EXPONENT.
04B2  12C8                 B   G, EQENT               EXPONENTS NOT EQUAL.
                 *
04B3  4843       EXFUNC    L   AR, MR4                LO FIRST.
04B4  2040                 T   UT                     CHECK OPERATOR.
04B5  11BE                 B   L, EXADD
```

```
                  *
04B6   5B00    E<SUB     L   FLR, X'O'
04B7   E227              S   MR2, MR2            LEAST DIFFERENCE.
04B8   4830              L   AR, MR3, NC
04B9   EA17              S   MR1, MR1            HI DIFFERENCE.
04BA   12D4              B   G, NRMAL            RESULT NOT ZERO.
04BB   3040              C   CB                  CLEAR AND TERMINATE.
4BC    5005              L   RAH, H(ZRORST)
4BD    519D       *      L   RAL, L(ZRORST)
04BE   5B00    EXADD     L   FLR, X'O'
04BF   C227              A   MR2, MR2            LEAST SUM.
04C0   4830              L   AR, MR3, NC
04C1   C117              A   MR1, MR1            HI SUM.
04C2   3040              C   CB
04C3   5005              L   RAH, H(ZRORST)
04C4   1273              B   G, CRYTST           NOT ZERO, TEST CARRY.
04C5   519D              L   RAL, L(ZRORST)      CLEAR AND TERMINATE.
               *
04C6   4CA8    EQENT     L   CNTR, MDR, SL+NC    EXPONENT DIFFERENCE.
04C7   48A3              L   AR, MDR
04C8   5A06              L   MDR, X'6'
04C9   E8A7              S   AR, MDR
04CA   11CE              B   L, EQULIZ           SOME SIGNIFICANCE.
04CB   5100              L   MR1, X'O'           LOST SIGNIFICANCE.
04CC   5200              L   MR2, X'O'
04CD   1FB3              B   CVGL, EXFUNC
               *
               *IF EXPONENT DIFFERENCE IS NOT ZERO, SHIFT SMALLER OPERAND RIGHT THE NUMBER OF TIMES
                 SPECIFIED BY THIS DIFFERENCE
               *
04CE   4115    EQULIZ    L   MR1, MR1, SR+CO
04CF   4226              L   MR2, MR2, SR+CI
04D0   4115              L   MR1, MR1, SR+CO
04D1   4226              L   MR2, MR2, SR+CI
04D2   10CE              B   CIR, EQULIZ         LOOP.
04D3   1FB3              B   CVGL, EXFUNC
               *
               *
04D4   5400    NRMAL     L   MR4, X'O'           CLEAR NORM COUNT.
04D5   SBFF              L   AR, X'FF'           TO TEST 2 HEX DIGITS.
04D6   5B00              L   FLR, X'O'
04D7   8117              N   MR1, MR1            TEST HI BYTE.
04D8   12E2              B   G, NRMFO            SOME BIT SET.
04D9   5404              L   MR4, X'4'           INCREMENT.
04DA   412F              L   MR1, MR2, CS
04DB   8117              N   MR1, MR1            TEST MID BYTE.
04DC   482F              L   AR, MR2, CS
04DD   A213              X   MR2, MR1, NF        8 BIT SHIFT LEFT.
04DE   F2E2              B   G, NRMFO            SOME BIT SET.
04DF   540B              L   MR4, X'8'           INCREMENT.
04E0   412F              L   MR1, MR2, CS
04E1   5200              L   MR2, X'O'           8 BIT SHIFT LEFT.
               *END OF COARSE ADJUSTMENTS
04E2   5B00    NRMFO     L   FLR, X'O'
04E3   58F0              L   AR, X'FO'           FOR HI HEX DIGIT.
04E4   8317              N   MR3, MR1
04E5   12F0              B   G, NRMF IN          NORMALIZED.
               *
               *NEED A 4 BIT SHIFT LEFT
               *
04E6   4229              L   MR2, MR2, SL+CO
04E7   411A              L   MR1, MR1, SL+CI
04E8   4229              L   MR2, MR2, SL+CO
04E9   411A              L   MR1, MR1, SL+CI
04EA   4229              L   MR2, MR2, SL+CO
04EB   411A              L   MR1, MR1, SL+CI
04EC   4229              L   MR2, MR2, SL+CO
04ED   411A              L   MR1, MR1, SL+CI
04EE   5802              L   AR, X'2'
04EF   6447              O   MR4, MR4            INCREMENT.
               *
               *NORMALIZATION COMPLETE
               *
04F0   444F    NRMF IN   L   MR4, MR4, CS
04F1   4893              L   AR, IR
04F2   E947              S   IR, MR4             DECREMENT RESULT EXPON.
04F3   3040              C   CB
04F4   5005              L   RAH, H(FEND)
04F5   189B              B   C, EXPUF            EXPONENT UNDERFLOW.
04F6   5176              L   RAL, L(FEND)
               *
04F7   459F    BGTRA     L   MAR, IR, CS
04F8   4555              L   MAR, MAR, SR+CO
04F9   4886              L   AR, NULL, SR+CI     000 IF ADD, 8000 IF SUB.
04FA   A337              X   MR3, MR3
04FB   1FA1              B   CVGL, CONT
               *
               *
               ORG X'500'
               *
               *FLOATING-POINT MULTIPLY AND DIVIDE
               *
0500   3080    FMPDV     C   SB
0501   50FF              L   MRO, X'FF'
0502   4803              L   AR, MRO
0503   400F              L   MRO, MRO, CS
0504   5B00              L   FLR, X'O'
0505   644F              O   MR4, MR4, NA
0506   8537              N   MAR, MR3            CHECK SECOND OF.
0507   130B              B   GL, CFOP
               *SECOND OP EQUALS ZERO
0508   489F              L   FLR, IR, CS         CHECK OP.
0509   1185              B   L, D FAULT          DIVIDE FAULT INTERRRUPT.
050A   1F90              B   CVGL, ZRORST        MPY RESULT ZERO.
               *
050B   5B00    CFOP      L   FLR, X'O'
050C   622F              O   MR2, MR2, NA
050D   8517              N   MAR, MR1            CHECK FIRST OP.
050E   1311              B   GL, EXPON           NEITHER OP ZERO.
050F   3040              C   CB
```

```
0510   5190            L    RAL, L (ZRORST)          ZERO RESULT.
*
*
0511   4808   EXPON    L    AR, MRO, SL+NC           X'FE00'.
0512   4038            L    MRO, MR3, SL+NC          EXPONENTS LEFT 1.
0513   4518            L    MAR, MR1, SL+NC
0514   8007            N    MR0, MR0                 MASK OUT FRACTION.
0515   8557            N    MAR, MAR
0516   5801            L    AR, X'1'                 MOVE SIGN FROM.
0517   2040            T    UT                       UTILITY TO IR15.
0518   121A            B    G, CTEST
0519   5800            L    AR, X'0'
051A   6997   CTEST    O    IR, IR                   INSERT SIGN.
051B   489C            L    FLR, IR, CS+NC           OP DOWN.
051C   4A86            L    MDR, NULL, SR+CI         X'8000'.
051D   48A0            L    AR, MDR, NC
051E   A000            X    MR0, MR0, NF+NC          CONVERT TO TWO'S.
051F   A550            X    MAR, MAR, NF+NC          COMPLEMENT NOTATION.
0520   58FF            L    AR, X'FF'
0521   8110            N    MR1, MR1, NF+NC          STRIP EXPONENTS.
0522   8330            N    MR3, MR3, NF+NC
0523   8990            N    IR, IR, NF+NC            STRIP OP CODE.
0524   4850            I    AR, MAR, NC              FIRST OP EXPONENT.
0525   11AB            B    L, CFDIV                 DIVIDE.
*
*MULTIPLY, ADD EXPONENTS
*
0526   5B00            L    FLR, X'0'
0527   C807            A    AR, MRO
0528   14A9            B    V, WRONG                 OVERFLOW OR UNDERFLOW.
0529   CBA4            A    AR, MDR, NC              BACK TO EXCESS 64.
052A   6997            O    IR, IR
*
*RESULT EXPONENT ESTABLISHED, CONTINUE MULTIPLY
*
052B   45BB            L    MAR, IR4, SL
052C   4AE3            L    MOR, YD                  DELAY FOR PTYS.
052D   5802            L    AR, X'2'
052E   4AE3            L    MDR, YD
052F   3300            C    PW                       SAVE.
0530   C554            A    MAR, MAR, NC
0531   4AF3            L    MDR, YDP1
0532   3300            C    PW                       SAVE.
*
* GENERAL REGISTERS MADE AVAILABLE FOR MPY LOOPS BY SAVING TEMPORARILY IN FMPY
*   FIRST OP LOCATIONS
*
0533   5C00            L    CNTR, X'0'
0534   4823            L    AR, MR2                  MULTIPLICAND.
0535   5E00            L    YD, X'0'
0536   4F43            L    YDP1, MR4                MULTIPLIER.
0537   3400            C    MPY
0538   4EE7            L    YD, YD, SR
0539   CEE5            A    YD, YD, CO
053A   4AE7            L    MDR, YD, SR              LOAD LOW.
*
*PARTIAL PRODUCTS COLLECTED IN MAR, MDR. FIRST
*PRODUCT TRUNCATED TO 16 MOST SIGNIFICANT BITS
*
053B   5E00            L    YD, X'O'
053C   4F33            I    YDP1, MR3                MULTIPLIER.
053D   3400            C    MYP
053E   4EE7            L    YD, YD, SR
053F   CEE5            A    YD, YD, CO
0540   4EE5            L    YD, YD, SR+CO
0541   48F6            L    AR, YDP1, SR+CI
0542   CAA5            A    MDR, MDR, CO             PARTIAL PRODUCT LO.
0543   C5EE            A    MAR, YD, NA+CI           PARTIAL PRODUCT HI.
*SECOND PARTIAL PRODUCT
0544   4843            L    AR, MR4                  MULTIPLICAND.
0545   5E00            L    YD, X'O'
0546   4F13            L    YDP1, MR1                MULTIPLIER.
0547   3400            C    MPY
0548   4EE7            L    YD, YD, SR
0549   CEE5            A    YD, YD, CO
054A   4EE5            L    YD, YD, SR+SO
054B   48F6            L    AR, YDP1, SR+CI
054C   CAA5            A    MDR, MDR, CO
054D   48E0            L    AR, YD, NC
054E   C556            A    MAR, MAR, CI
*THIRD PARTIAL PRODUCT
054F   5B00            L    FLR, X'O'                FILLER.
0550   4833            L    AR, MR3                  MULTIPLICAND.
0551   SE00            L    UYD, X'O'
0552   4F13            L    YDP1, MR1                MULTIPLIER.
0553   3400            C    MPY
0554   4EE7            L    YD, YD, SR
0555   CEE5            A    YD, YD, CO
0556   48E5            L    AR, YD, SR+CO
0557   4FF6            L    YDP1, YDP1, SR+CI
0558   C2A5            A    MR2, MDR, CO             LO PRODUCT.
0559   48F0            L    AR, YDP1, NC
055A   C156            A    MR1, MAR, CI
*FOURTH AND FINAL PRODUCT
*
*RESTORE YD AND YDP1
055B   458B            L    MAR, IR4, SL
055C   3100            C    MR                       FETCH YD.
055D   5802            L    AR, X'2'                 RESTORE.
055E   4EA3            L    YD, MDR
055F   C550            A    MAR, MAR, NF+NC
0560   3100            C    MR                       FETCH YDP1.
0561   S4F0            L    MR4, X'F0'
0562   4FA3            L    YDP1, MDR                RESTORE.
0563   484F            L    AR, MR4, GS              X'F000'.
0564   5B00            L    FLR, X'0'
0565   5C08            L    CNTR, X'8'               FOR BACK 8.
0566   8817            N    AR, MR1                  TEST FOR NORMALIZATION.
0567   126E            B    G, FINAL                 NORMALIZED.
```

```
                  *
                  *PRODUCT HAD TO BE SHIFTED RIGHT 8 PLACES, AS A RESULT, COULD BECOME UN-NORMALIZED BY
                  *  ONE HEX
                  *POSITION IN THIS CASE, ONLY SHIFT RIGHT 4 PLACES.
0568    5402      *                  L     MR4, X'2'
0569    444F                         L     MR4, MR4, CS         X'0200'.
056A    4893                         L     AR, IR               EXPONENT.
056B    E947                         S     IR, MR4              DECREMENT.
056C    189B                         B     C, EXPUF             UNDERFLOW.
056D    5C04                         L     CNTR, X'4'           FOR BACK 4.
                  *
056E    4155      FINAL              L     MR1, MR1, SR+CO      SHIFT PRODUCT RIGHT.
056F    4227                         L     MR2, MR2, SR         ONE OR TWO HEX PLACES.
0570    106E                         B     CTR, FIAL
                  *ROUND NOW BY ADDING BACK IN LAST SHIFTED CARRY
0571    C22F                         A     MR2, MR2, NA
0572    C11E                         A     MR1, MR1, NA+CI
                  *
                  *
0573    4B1F      CRYTST             L     FLR, MR1, CS         WAS THERE A CARRY?
0574    3080                         C     SB
0575    1F8E                         B     CVGL, RISHFT         YES.
                  *
                  *
                  *
                  *
0576    3080      FEND               C     SB
0577    4895                         L     AR, IR, SR+CO        SIGN TO CARRY.
0578    4896                         L     AR, IR, SR+CI        SIGN AND EXPONENT.
0579    54FF                         L     MR4, X'FF'
057A    444F                         L     MR4, MR4, CS         X'FF00'.
057B    8847                         N     AR, MR4
057C    6113                         O     MR1, MR1, NF         INSERT EXP AND SN.
057D    48BB                         L     AR, IR4, SL
057E    D502                         A     MAR, X'2'
057F    4B94                         L     FLR, IR, SR+NC
0580    6A2F                         O     MDR, MR2, NA
0581    3300                         C     PW                   STORE LO RESULT.
0582    45BB                         L     MAR, IR4, SL
0583    6A1F                         O     MDR, MR1, NA
0584    3340                         C     PW+CB                STORE HI RESULT.
0585    4460      DFAULT             L     MR4, LOC, NC         SAVE LOCCNT.
0586    0664                         D     LOC, LOC, JAM        FLAGS TO CC.
0587    4640                         L     LOC, MR4, NC         RESTORE LOC
0588    148B                         B     V, FFAULT
                  *
0589    4560      CEXIT              L     MAR, LOC, NC         ADRS NEXT INSTR.
058A    066F                         D     LOC, LOC, P2J        EXIT.
                  *
058B    3040      FFAULT             C     CB
057C    5000                         L     RAH, H(FLPENB)       FLOATING-POINT.
058D    51A3                         L     RAL, L(FLPENB)       ARITHMETIC FAULT.
                  *
058E    4155      RTSHFT             L     MR1, MR1, SR+CO
058F    4226                         L     MR2, MR2, SR+CI
0590    4155                         L     MR1, MR1, SR+CO
0591    4226                         L     MR2, MR2, SR+CI
0592    4115                         L     MR1, MR1, SR+CQ
0593    4226                         L     MR2, MR2, SR+CI
0994    4115                         L     MR2, MR1, SR+CO
0595    4226                         L     MR2, MR2, SR+CI
0596    5402                         L     MR4, X'2'
0597    484F                         I     AR, MR4 CS
0598    C995                         A     IR, IR, CO           INCREMENT EXPONENT.
0599    18A3                         B     C, EXPOF
059A    1F76                         B     CVGL, FEND
                  *
059B    5808      EXPUF              L     AR, X'8'
059C    6997                         O     IR, IR               SET V FLAG SAVE.
059D    58EE      ZEORST             L     AR, X'EE'
059E    8997                         N     IR, IR               RESET EXPON, SIGN.
059F    3080      MDCLR              C     SB
05A0    4183                         L     MR1, NULL            CLEAR HIGH RESULT.
05A1    4283                         L     MR2, NULL            CLEAR LOW RESULT.
05A2    1076                         B     CIR, FEND
                  *
05A3    51FF      EXPOF              L     MR1, X'FF'           HI RESULT X'FF'.
05A4    4B1F                         L     AR, MR1, CS
05A5    6217                         O     MR2, MR1             LO RESULT X'FFFF'.
05A6    7808                         O     AR, X'B'             ONES TO EXP AND V FLAG.
05A7    6997                         O     IR, IR
05A8    1F76                         B     CVGL, FEND
                  *
                  *
05A9    11A3      WRONG              B     L, EXPOF             EXPONENT OVERFLOW.
05AA    1F98                         B     CVGL, EXPUF          EXPONENT UNDERFLOW.
                  *
                  *DIVIDE
                  *
05AB    5B00      CFDIV              L     FLR, X'O'
05AC    E807                         S     AR, MRO              SUBTRACT EXPONENTS.
05AD    14A9                         B     V, WRONG             OVERFLOW OR UNDERFLOW.
05AE    C8A4                         A     AR, MDR, NC          BACK TO EXCESS 64.
05AF    6997                         O     IR, IR
                  *
                  *RESULT EXPONENT ESTABLISHED, CONTINUE DIVIDE
                  *
05B0    E44D                         S     MR4, MR4, NA+CO      TWO'S COMPLEMENT.
05B1    E33E                         S     MR3, MR3, NA+CI      DIVIDEND.
05B2    4B23                         L     AR, MR2
05B3    CA45                         A     MDR, MR4, CO         LO FIRST.
05B4    4B10                         L     AR, MR1, NC
05B5    C837                         A     AR, MR3
05B6    18C9                         B     C, ADJST             ADJUST FOR OVERFLOW.
05B7    3010      FSTRT              C     CUT                  SET PASS 1 INDICATOR.
05B8    5000                         L     MRO, X'O'            CLEAR LO QUOTIENT.
05B9    5500                         L     MAR, X'O'            CLEAR HI QUOTIENT.
                  *
                  *DIVIDE LOOP
                  *
05BA    4823      FDVLP              L     AR, MR2
05BB    CA45                         A     MDR, MR4, CO         LOW.
05BC    4810                         L     AR, MR1, NC
```

```
05BD  C837            A   MR, MR3              HIGH.
05BE  18D2            B   C, QUOT              QUOTIENT IS ONE.
                *QUOTIENT IS ZERO
                *
05BF  400B      SHFT  L   MR0, MR0, SL         SHIFT QUOTIENT.
05C0  455A            L   MAR, MAR, SL+CI
05C1  4229            L   MR2, MR2, SL+CO      SHIFT REMAINDER.
05C2  411A            L   MR1, MR1, SL+CI
05C3  10BA            B   CTR, FDVLP           RETURN TO LOOP.
                *
05C4  2040            T   UT                   TEST PASS.
05C5  12D5            B   G, FDEXT             END PASS2.
                *SET UP FOR PASS2
05C6  5C0A            L   CNTR, X'A'           TEN MORE LOOPS.
05C7  3020            C   SUT                  SET EXIT.
05C8  1FBA            B   CVGL, FDVLP          RETURN.
                *
                *
05C9  5002      ADJUST L  MR0, X'2'
05CA  480F            L   AR, MR0, CS
05CB  C997            A   IR, IR               INCREMENT EXPONENT.
05CC  18A3            B   C, EXPOF             EXPONENT OVERFLOW.
05CD  5C04            L   CNTR, X'4'
05CE  4449      LP    L   MR4, MR4, SL+CO      SHIFT LEFT ONE.
05CF  433A            L   MR3, MR3, SL+CI      HEX POSITION.
05D0  10CE            B   CTR, LP
05D1  1FB7            B   CVGL, FSTRT
                *
                *RESTORE REMAINDER
05D2  6184      QUOT  O   MR1, NULL, NC        HI REMAINDER.
05D3  42A0            L   MR2, MDR, NC         LO REMAINDER.
05D4  18BF            B   C, SHFT              CONTINUE.
                *
                *USE 25TH QUOTIENT BIT FOR ROUNDING
05D5  4155      FDEXT L   MR1, MAR, SR+CO      HI QUOTIENT.
05D6  4207            L   MR2, MR2, SR         LO QUOTIENT.
90D7  C22F            A   MR2, MR2, NA         ADD CARRY BACK IN.
05D8  C11E            A   MR1, MR1, NA+CI
05D9  1F76            B   CVGL, FEND           EXIT ROUTINE.
                *
                *
                *
                *FLOATING POINT COMPARE
                *
05DA  4819      FCOMP L   AR, MR1, SL+CO       A SIGN TO CARRY.
05DB  2040            T   UT
05DC  11DF            B   1, ALIKE
                *
                *IF SIGNS DIFFER, SET G, L AND EXIT
05DD  681C            O   AR, MR1, NA+NC
05DE  5189            L   RAL, L (CEXIT)
                *
                *IF SIGNS ALIKE, SUBTRACT TO COMPARE MAGNITUDES
05DF  18E6      ALIKE B   C, COMPEM            2'S COMP IF NEGATIVE.
05E0  5B00      COMPR L   FLR, X'0'
05E1  4823            L   AR, MR2              LO FIRST OP.
05E2  E845            S   AR, MR4, CO          MINUS LO SECOND OP.
05E3  4810            L   AR, MR1, NC          HI FIRST OP.
05E4  E837            S   AR, MR3              MINUS HI SECOND OP.
05E5  1089            B   CTR, CEXIT
                *THE FLAGS ARE CORRECTLY SET BY THE SUBSTRACT
05E6  3080      *COMPEM C SB
05E7  E44D            S   MR4, MR4, NA+CO      TWO'S COMPLEMENT.
05E8  E33E            S   MR3, MR3, NA+CI      BOTH OPERANDS.
05E9  E22D            S   MR2, MR2, NA+CO
05EA  E11F            S   MR1, MR1, NA+CI
05E8  1FE0            B   CVGL, COM PR
                *
                *
                *
                *HALFWORD I/O
                *
05EC  48E3      RHR   L   AR, YS               NO-OP PTYS RESET.
05ED  4563            L   MAR, LOC             DELAY FOR PTYS.
05EE  4DE1            L   IO, YD, ADRS         ADDRESS DEVICE.
05EF  48DE            L   AR, IO, DR+CS        INPUT HI.
05F0  44D2            L   MR4, IO, DR          INPUT LO.
05F1  6243            O   YS, MR4, NF          COMBINE AND LOAD.
05F2  066F            D   LOC, LOC, P2J
                *
05F3  4DE1      RH    L   IO, YD, ADRS         ADDRESS DEVICE.
05F4  48DE            L   AR, IO, DR+CS        INPUT HI.
05F5  4AD2            L   MDR, IO, DR          INPUT LO.
05F6  6AA3            O   MDR, MDR, NF         COMBINE.
05F7  3200            C   MW                   AND STORE.
05F8  4563            L   MAR, LOC             ADRS NEXT INSTR.
05F9  066F            D   LOC, LOC, P2J        GO.
                *
                *
                *
                *
                      ORG X'600'
                *FLOATING POINT STORE
                *
0600  48B8      FSTORE L  AR, IR4, SL+NC
0601  5353            L   MR3, MAR             SAVE STORE ADRS.
0602  951C            N   MAR, X'1C'           DEVELOP REGISTER ADRS.
0603  3100            C   MR                   FETCH HI FIRST OP.
0604  4853            L   AR, MAR
0605  4533            L   MAR, MR3
0606  3200            C   MW                   STORE HI OPERAND.
0607  D502            A   MAR, X'2'
0608  3100            C   MR                   FETCH LO FIRST OP.
0609  4833            L   AR, MR3
060A  D502            A   MAR, X'2'
060B  3200            C   MW                   STORE LO.
060C  4563            L   MAR, LOC             ADRS NEXT INSTR.
060D  066B            D   LOC, LOC, P2N        EXIT.
```

```
                    *
                    *
                    *
                    *FLOATING-POINT LOAD
                    *
060E    4898        FLODRR     L     AR, IR, SL            RR ENTRY.
060F    951C                   N     MAR, X'IC'            SECOND OP REGISTER.
0610    3100                   C     MR                    FETCH.
                    *
0611    5004        FLODRX     L     RAH, H(NRMAL)
0612    3080                   C     SB
0613    4894                   L     AR, IR, SR+NC
0614    9970                   N     IR, X'70'             MASK YD FIELD.
0615    58FF                   L     AR, X'FF'
0616    81A7*                  N     MR1, MDR              HI OPERAND.
0617    4813                   L     AR, MR1
0618    A0A3                   X     MR0, MDR, NF          EXPONENT AND SIGN.
0619    4809                   L     AR, MR0, SL+CO        SIGN TO CARRY.
061A    499A                   L     IR, IR, SL+CI         SIGN TO IR15.
061B    6993                   O     IR, IR, NF            EXPONENT TO IR.
061C    4853                   L     AR, MAR
061D    D502                   A     MAR, X'2'             ADRS LO.
061E    3100                   C     MR                    FETCH LO SECOND OP.
061F    62AF                   O     MR2, MDR, NA          LOAD LO SECOND OP.
0620    13D4                   B     GI, NRMAL             NOT ZERO, NORMALIZE.
0621    3040                   C     CB
0622    5005                   L     RAH, H(ZRORSI)
0623    519D                   L     RAL, L(ZRORST)        CLEAR AND TERMINATE.
                    *
                    *END OF INITIAL LOAD SEQUENCE
                    *
                    *
                    *
                    *
                    *FULLWORD SHIFTS
                    *
0624    5006        SRL        L     RAH, H(SRL)           SET PAGE.
0625    5400                   L     MR4, X'0'
0626    5810                   L     AR, X'10'             TEST 16 OR GREATER.
0627    8CA7        RREM       N     CNTR, MDR
0628    1220                   B     G, SHRF               DO SHIFTS.
0629    6B88        TESTR      O     FLR, NULL, NF         TEST PASS
062A    1F62                   B     CVGL, EXTS            DONE.
062B    580F                   L     AR, X'F'              SET PASS 2.
062C    5127                   L     RAL, L(RREM)
                    *
062D    4EE5        SHRF       L     YD, YD, SR+CO         SHIFT HI.
062E    4FF7                   L     YDP1, YDP1, SR        SHIFT LO.
062F    102D                   B     CIR, SHRF
                    *
0630    448A                   L     MR4, NULL, SL+CI      SAVE CARRY.
0631    5129                   L     RAL, L(TESTSR)
                    *
                    *
0632    5000        SLI        L     RAH, H(S4L)           SET PAGE.
0633    5400                   L     MR4, X'0'
0634    5810                   L     AR, X'10'             TEST 16 OR GREATER.
0635    8CA7        LREM       N     CNTR, MDR
0636    1238        TESTSL     B     G, SHLF               DO SHIFTS.
0637    6B83                   O     FLR, NULL, NF         TEST PASS.
0638    1F62                   B     CVGL, EXTS            DONE.
0639    580F                   L     AR, X'F'              SET PASS2.
063A    5135                   L     RAL, L(LREM)
063B    4FF9        *SHLF      L     YDP1, YDP1, SL+CO     SHIFT LO.
063C    4EEB                   L     YD, YD, SL            SHIFT HI.
063D    103B                   B     CTR, SHLF
063E    448A        *          L     MR4, NULL, SL+CI      SAVE CARRY.
063F    5137        *          L     RAL, L(TESTSL)
0640    5006        *SRA       L     RAH, H(SRA)           SET PAGE.
0641    5400                   L     MR4, X'0'
0642    5810                   L     AR, X'10'             TEST 16 OR GREATER.
0643    8CA7        RAEM       N     CNTR, MDR
0644    1249                   B     G, SARF               DO SHIFTS.
0645    6B83        TESTAR     O     FLR, NULL, NF         TEST PASS.
0646    1F62                   B     CVGL, EXTS            DONE.
0647    580F                   L     AR, X'F'              SET PASS 2.
0648    5143                   L     RAL, L(RAEM)
0649    44E9        *SARF      L     MR4, YD, SL+CO        CATCH SIGN.
064A    4EE7                   L     YD, YD, SR            SHIFT HI.
064B    4FF7                   L     YDP1, YDP1, SR        SHIFT LO.
064C    1049        *          B     CTR, SARF
064D    448A                   L     MR4, NULL, SL+CI      SAVE CARRY.
064E    5145                   L     RAL, L(TESTAR)
                    *
                    *
064F    5006        SLA        L     RAH, H(SLA)           SET PAGE.
0650    5400                   L     MR4, X'0'
0651    5810                   L     AR, X'10'             TEST 16 OR GREATER.
0652    8CA7        LAEM       N     CNTR, MDA
0653    1258                   B     G, SALF               DO SHIFTS.
0654    6B83        TESTAL     O     FLR, NULL, NF         TEST PASS.
0655    1F62                   B     CVGL, EXTS            DONE.
0656    B81F                   X     AR, X'1F'             SET PASS 2.
0657    5152                   L     RAL, L(LAEM)
                    *
0658    4FF9        SALF       L     YDP1, YDP1, SL+CO     SHIFT LO.
0659    4EEB                   L     YD, YD, SL            SHIFT HI.
065A    4487                   L     MR4, NULL, SR         CATCH SIGN.
065B    4FF9        SALF 1     L     YDP1, YDP1, SL+CO     SHIFT LO.
065C    4EEB                   L     YD, YD, SL            SHIFT HI.
065D    105B                   B     CTR, SALF1
065E    444B                   L     MR4, MR4, SL          SWAP CARRY FOR SIGN.
065F    4EE7                   L     YD, YD, SR            COLLECT SIGN, COMPENSATE.
0660    4FF6                   L     YDP1, YDP1, SR+CI     PRE-SHIFT.
0661    5154                   L     RAL, L(TESTAL)
                    *
                    *
0662    5B00        EXTS       L     FLR, X'0'
```

```
0663  4445          L   MR4, MR4, SR+CO          CATCH SAVED CARRY.
0664  6FFC          O   YDP1, YDP1, NA+NC        SET FLAGS.
0665  6FFC          O   YD, YD, NA+NC
0666  4560          L   MAR, LOC, NC             ADRS NEXT INSTR.
0667  066F          D   LOC. LOC, P2J            EXIT.
            *
            *
            *ROTATE FULLWORD
            *
0668  5006  RRL     L   RAH, H(RRL)              SET PAGE.
0669  5400          L   MR4, X'0'
066A  5810          L   AR, X'10'                TEST 16 OR GREATER.
066B  8CA7  RRREM   N   CNTR, MDR
066C  1271          B   G, RTRF                  DO ROTATES.
066D  6B83  TESTRR  O   FLR, NULL, NF            TEST PASS.
066E  1F62          B   CVGL, EXTS               DONE.
066F  580F          I   AR, X'F'                 SET PASS2.
0670  516B          L   RAL, L(RRREM)
            *
0671  43F5  RTRF    L   MR3, YDP1, SR+CO         CATCH LSB.
0672  4EE7          L   YD, YD, SR               SHIFT HI.
0673  4FF7          L   YDP1, YDP1, SR           SHIFT LO.
0674  1071          B   CTR, RTRF
            *
0675  516D          L   RAL, L(TESTRR)
            *
            *
0676  5006  RLL     L   RAH, H(RLL)              SET PAGE.
0677  5400          L   MR4, X'0'
0678  5810          L   AR, X'10'                TEST 16 OR GREATER.
0679  8CA7  RLREM   N   CNTR, MDR
067A  127F          B   G, RTLF                  DO ROTATES.
067B  6B83  TESTRL  O   FLR, NULL, NF            TEST PASS.
067C  1F62          B   CVGL, EXTS               DONE.
067D  580F          L   AR, X'F'                 SET PASS2.
067E  5179          L   RAL, L(RLREM)
            *
067F  43E9  RTLF    L   MR3, YD, SL+CO           CATCH MSB.
0680  4FFB          L   YDP1, YDP1, SL           SHIFT LO.
0681  4EEB          L   YD, YD, SL               SHIFT HI.
0682  107F          B   CTR, RTLF
            *
0683  517B          L   RAL, L(TESTRL)
            *TEST HALFWORD IMMEDIATE
            *
0684  48E3  THI     L   AR, YD                   1ST OP TO AR.
0685  88A7          N   AR, MDR                  EXECUTE AND.
0686  4563          L   MAR, LOC                 ADRS NEXT INSTR.
0687  066F          D   LOC, LOC, P2J            GO.
            *CIRCULAR LIST SUPPORT INSTRUCTIONS
            *
            *ADD TO LIST
            *
            *
            *COMMON ENTRY FOR ATL, ABL
            *UT SET IF ENTERED FROM ISB SERVICE
            *
0688  5006  ATBL    L   RAH, H(ATBL)             SET PAGE.
0689  48AF          L   AR, MDR, CS              NO.USED/MAX SLOT.
068A  E4A7          S   MR4, MDR                 NO.USED=MAX SLOT.
068B  1390          B   C, ADDIO                 OK IF LESS THAN.
            * OVERFLOW IF EQUAL TO OR GREATER THAN
068C  2040          T   UT
068D  12C1          B   G, LISTOV                PSW SWAP ON OVERFLOW.
068E  SB04  VFALG   L   FLR,X'4'                 SET V.
068F  B1B5          L   RAL, L(COMEX)            AND EXIT.
            *
0690  CAAF  ADDTO   A   MDR, MDR, NA
0691  3280          C   MW+SB
0692  F401          S   MR4, X'1'
0693  444F          L   MR4, MR4, CS
0694  B802          L   AR, X'2'
0695  0554          A   MAR, MAR, NC
0696  3100          C   MR                       TOP/BOTTOM.
0697  489F          L   AR, IR, CS               OP-CODE DOWN.
0698  9801          N   AR, X'1'
0699  6557          O   MAR, MAR                 MAR ODD IF ABL.
069A  48AF          L   AR, MDR, CS              PROPER POINTER.
069B  91FF          N   MR1, X'FF'.              TO MR1.
0690  4855          L   AR, MAR, SR+CO           TEST EVEN/ODD.
069D  4810          L   AR, MR1, NC              POSITION POINTER.
069E  1887          B   C, BOTTOM                ADD TO BOTTOM.
            * ADD TO TOP
069F  F201          S   MR2, X'1'                DECREMENT TOP.
06A0  5B00          L   FLR, X'0'
06A1  6B87          O   AR, NULL                 TEST FOR ZERO.
06A2  12A5          B   G, ATL                   NO WRAP.
            * LIST RAP ; SET 'CURRENT TOP' TO MAX
06A3  484F          L   AR, MR4, CS
06A4  92FF          N   MR2, X'FB'
06A5  4828  ATL     L   AR, MR2, SL+NC           USE NEW VALUE.
            *
06A6  4A2F  ADDIT   L   MDR, MR2, CS             INSERT UPDATED.
06A7  3240          C   MW+CB                    POINTER AND RESTORE.
06A8  C854          A   AR, MAR, NC
06A9  D502          A   MAR, X'2'                ADRS SLOT.
06AA  2040          T   UT                       TEST IF ISB SERVICE.
06AB  11B2          B   L, ALIST
06AC  4A04          L   MRD, MR0, SR+NC          GET ELEMENT.
06AD  4AAB          L   MDR, MDR, SL+NC          FORCE EVEN.
06AE  3800          C   PW                       STORE IT.
06AF  4733          L   PSW, MR3                 RESTORE PSW.
06B0  5002          L   RAH, R(TERM3)
06B1  519A          L   RAL, L(TERM3)
            *
06B2  4AE3  ALIST   L   MDR, YD                  GET ELEMENT.
06B3  3200          C   MW                       STORE IT.
06B4  5B00          L   FLR, X'0'
            * COMMON EXIT
            *
06BS  4563  COMEX   L   MAR, L-C                 ADRS NEXT INSTR.
```

```
06B6   066F                D     LOC, LOC, P2J         EXIT.
       *
06B7   D201   BOTTOM       A     MR2, X' 1'            INCREMENT 'NEXT BOTTOM'.
06B8   484F                L     AR, MR4, CS
06B9   98FF                N     AR, X'FF'
06BA   5B00                L     FLR, X'0'
06BB   A817                X     AR, MR1               COMPARE TO MAX.
06BC   12BE                B     G, ABL                NO WRAP.
       *LIST WRAP: SET 'NEXT BOTTON' TO ZERO.
06BD   5200                L     MR2, X'0'
06BE   4818   ABL          L     AR, MR1, SL+NC        USE ORIGIONAL VALUE.
06BF   3040                C     CB
06C0   51A6                L     RAL, L (ADDIT)
       *
       *
       *ISB LIST OVERFLOW
06C1   558A   LISTOV       L     MAR, X'8A'
06C2   4A04                L     MDR, MR0, SR+NC
06C3   4AA8                L     MDR, MDR, SL+NC       FORCE EVEN.
06C4   3340                C     PW+CB                 SAVE ABORTED ELEMENT.
06C5   4733                L     PSW, RM3              RESTORE PSW.
06C6   558C                L     MAR, X'8C'            ADRS LIST OVERFLOW PSW.
06C7   5000                L     RAH, H (GENSWP)
06C8   5119                L     RAL, L (GENSWP)       PSW SWAP.
       *
       *
       *
       *REMOVE FROM LIST
       *COMMON ENTRY FOR RIL, RBL
       *
06C9   5006   RTBL         L     RAH, H (RTBL)         SET PAGE.
06CA   48AF                L     AR, MDR, CS           NO.USED/MAX SLOT.
06CH   5301                L     MR3, X'1'
06CC   433F                L     MR3, MR3, CS          X'0100'.
06CD   E437                S     MR4, MR3              DEC. NO. USED  TALLY.
06CE   188E                B     C, VFLAG              LIST EMPTY.
       *LIST NOT EMPTY
06CF   444F                L     MR4, MR4, CS          MAX SLOT/NO. USED.
06D0   4A43                L     MDR, MR4
06D1   3280                C     MW+SB                 RESTORE.
06D2   4843                L     AR, MR4
06D3   E437                S     MR4, MR3              MAX SLOT/NO USED.
06D4   5804                L     AR, X'4'
06D5   C054                A     MR0, MAR, NC          ADRS OF SLOT 0.
06D6   5802                L     AR, X'2'
06D7   C554                A     MAR, MAR, NC
06D8   3100                C     MR                    TOP/BOTTOM.
06D9   489F                L     AR, IR, CS            OP-CODE DOWN.
06DA   9801                N     AR, X'1'              COLLECT IR BIT 7.
06DB   6557                O     MAR, MAR              MAR ODD IF RBL.
06DC   48AF                L     AR, MDR, CS           PROPER POINTERS.
06DD   91FF                N     MAR1, X'FF'           TO MR1.
06DE   4855                L     AR, MAR, SR+CO        TEST EVEN/ODD.
06DF   4810                L     AR, MR1, NC           POSITION POINTER.
06E0   18EH                B     C, RBL                REMOVE FROM BOTTOM.
       *REMOVE FROM TOP
06E1   D201                A     MR2, X'1'             INC. 'CURRENT TOP'.
06E2   484F                L     AR, MR4, CS
06E3   98FF                N     AR, X'FF'             MAX SLOT NUMBER.
06E4   5B00                L     FLR, X'O'
06E5   A817                X     AR, MR1               CURRENT TOP:MAX.
06E6   12E8                B     G, RTL                NO WRAP.
       *TABLE WRAP, SET CURRENT TOP POINTER TO ZERO
06E7   5200                L     MR2, X'O'
06E8   4818   RTL          L     AR, MR1, SL+NC        USE ORIGINAL VALUE.
06E9   3040                C     CB
06EA   S1F1                L     RAL, L(REMOV)
06EB   E287   *RBL         S     MR2, NULL             DECREMENT 'NEXT BOTTOM'.
06EC   18EE                B     C, UNDER              TABLE WRAP, SET TO MAX.
06ED   13F0                B     GL, RBL1              NO WRAP.
06EE   484F   UNDER        L     AR, MR4, CS
06EF   92FF                N     MR2, X'FF'            SET TO MAX.
06F0   4828   RBL1         L     AR, MR2, SL+NC        USE NEW VALUE.
06F1   4A2F   REMOV        L     MDR, MR2, CS          INSERT UPDATED.
06F2   3240                C     MW+CB                 POINTER AND RESTORE.
06F3   5B00                L     FLR, X'O'
06F4   C500                A     MAR, MRO, NF+NC       ADRS SLOT.
06F5   3100                C     MR
06F6   58FF                L     AR, X'FF'
06F7   8847                N     AR, MR4               TEST NO. USED TALLY.
06F8   4EA3                L     YD, MDR               GET ELEMENT.
06F9   51B5                L     RAL, L(COMEX)         EXIT.
       *FLR=0 IF LIST NOW EMPTY
       *FLR=2 IF LIST NOT EMPTY
       *
                           ORG   X'700'
       *
       *
0700   4AF3   STH          L     MDR, YD               1ST OP TO MDR.
0701   3200                C     MW                    STORE IT.
0702   4563                L     MAR, LOC              ADRS NEXT INSTR.
0703   066B                D     LOC, LOC, P2N         GO.
       *
       *
0704   8EE7   NHR          N     YD, YS                EXECUTE AND.
0705   066F                D     LOC, LOC, P2J         GO.
       *
       *
0706   48E3   NH           L     AR, YD                1ST OP TO AR.
0707   8EA7                N     YD, MDR               EXECUTE AND.
0708   4563                L     MAR, LOC              ADRS NEXT INSTR.
0709   066F                D     LOC, LOC, P2J         GO.
       *
       *
070A   EAE5   CLHR         S     MDR, YS, CO           SUB TO SET FLAGS.
070B   066F                D     LOC, LOC, P2J         GO.
       *
       *
070C   48E3   CLH          L     AR, YD                1ST OP TO AR.
070D   EAA5                S     MDR, MDR, CO          SUB TO SET FLAGS.
```

```
070E  4560            L   MAR, LOC, NC        ADRS NEXT INSTR.
070F  066F            D   LOC, LOC, P2J       GO.
           *
           *
0710  6EE7   OHR      O   YD, YS              EXECUTE OR.
0711  066F            D   LOC, LOC, P2J       GO.
           *
           *
0712  48E3   OH       L   AR, YD              1ST OP TO AR.
0713  6EA7            O   YD, MDR             EXECUTE OR.
0714  4563            L   MAR, LOC            ADRS NEXT INSTR.
0715  066F            D   LOC, LOC, P2J       GO.
           *
           *
0716  AEE7   XHR      X   YD, YS              EXECUTE XOR.
0717  066F            D   LOC, LOC, P2J       GO.
           *
           *
0718  48E3   XH       L   AR, YD              1ST OP TO AR.
0719  AEA7            X   YD, MDR             EXECUTE XOR.
071A  4563            L   MAR, LOC            ADRS NEXT INSTR.
071B  066F            D   LOC, LOC, P2J       GO.
           *
           *
071C  6EEF   LHR      O   YD, YS, NA          SET FLAGS AND LOAD.
071D  066F            D   LOC, LOC, P2J       GO.
           *
           *
071E  6EAF   LH       O   YD, MDR, NA         SET FLAGS AND LOAD.
071F  4563            L   MAR, LOC            ADRS NEXT INSTR.
0720  066F            D   LOC, LOC, P2J       GO.
           *
           *
0721  4AE3   CHR      L   MDR, YS             2ND OP TO MDR.
0722  5007   CH       L   RAH, H(CH)          SET PAGE (DELAY FOR PTYS).
0723  48E3            L   AR, YD              1ST OP.
0724  44E3            L   MR4, YD
0725  A3A7            X   MR3, MDR            COMPARE SIGNS.
0726  112C            B   L, DIFFER
       *SIGNS ALIKE
0727  5800            L   FLR, X'O'
0728  4843            L   AR, MR4             1ST OP.
0729  EBA7            S   AR, MDR             MINUS 2ND OP TO SET FLAGS.
072A  4560   EXITC    L   MAR, LOC, NC        ADRS NEXT INSTR.
072B  066F            D   LOC, LOC, P2J       GO.
       *IF SIGNS DIFFER, SET C G L TO SIGN OF FIRST OP
072C  48F9   DIFFER   L   AR, YD, SL+CO       1ST OP SIGN TO C.
072D  68EF            O   AR, YD, NA          SET G OR L.
072E  512A            L   RAL, (EXITC)
           *
           *
           *
072F  4B70   ACHR     L   FLR, PSW, NC        PROPOGATE FLAGS.
0730  CEE7   AHR      A   YD, YS              EXECUTE ADD.
0731  066F            D   LOC, LOC, P2J       GO.
           *
       *ADD HALFWORD TO MEMORY
           *
0732  48A3   AHM      L   AR,MDR              1ST OP TO AR.
0733  CAE7            A   MDR, YD             DO ADD.
0734  3200            C   MW                  STORE RESULT.
0735  4560            L   MAR, LOC, NC        ADRS NEXT INSTR.
0736  066F            D   LOC, LOC, P2J       GO.
           *
           *
0737  4R70   ACH      L   FLR, PSW, NC        PROPOGATE FLAGS.
0738  48EO   AH       L   AR, YD, NC          1ST OP TO AR.
0739  CEA7            A   YD, MDR             EXECUTE ADD.
073A  4560            L   MAR, LOC, NC        ADRS NEXT INSTR.
073B  066F            D   LOC, LOC, P2J       GO.
           *
           *
073C  4B70   SCHR     L   FLR, PSW, NC        PROPOGATE FLAGS.
073D  EEE7   SHR      S   YD, YS              EXECUTE SUBTRACT.
073E  66F             D   LOC, LOC, P2J       GO.
           *
           *
073F  4B70   SCH      L   FLR, PSW, NC        PROPOGATE FLAGS.
0740  48E0   SH       L   AR, YD, NC          1ST OP TO AR.
0741  EEA7            S   YD, MDR             EXECUTE SUBTRACT.
0742  4560            L   MAR, LOC, NC        ADRS, NEXT INSTR.
0743  066F            D   LOC, LOC, P2J       GO.
           *
       *BYTE INSTRUCTIONS
           *
0744  4AE3   STBR     L   MDR, YS             2ND OP TO MDR.
0745  5501            L   MAR, X'1'           FORCE ODD.
0746  4AEF            L   MER, YD, CS         INSERT BYTE.
0747  42A3            L   YS, MDR             LOAD RESULT.
0748  4563            L   MAR, LOC            ADRS NEXT INSTR.
0749  066B            D   LOC, LOC, P2N       GO.
           *
           *
074A  4AEF   STB      L   MDR,. YD, CS        INSERT BYTE.
074B  32020           C   MW                  STORE RESULT.
074C  4563            L   MAR, LOC            ADRS NEXT INSTR.
074D  066B            D   LOC, LOC, P2N       GO.
           *
           *
074E  48E3   LBR      L   AR, YS              2ND OP TO AR.
074F  9EFF            N   YD, X'FF'           CLEAR HI, LOAD LO.
0750  0668            D   LOC, LOC, P2N       GO.
           *
           *
0751  48AF   LB       L   AR, MDR, CS         2ND OP TO AR.
0752  9EFF            N   YD,X'FF'            CLEAR HI, LOAD LO.
0753  4563            L   MAR, LOC            ADRS, NEXT INSTR.
0754  066B            D   LOC, LOC, P2N       GO.
           *
           *
0755  48AF   CLB      L   AR, MDR, CS         2N,OP TO AR.
0756  9AFF            N   MDR, X'FF'          MASK.
```

```
0757  48E3         L  AR, YD              1ST OP.
0758  98FF         N  AR, X'FF'           MASK.
0759  E8A5         S  AR, MDR, CO         SUB TO SET FLAGS.
075A  4560         L  MAR, LOC, NC        ADRS NEXT INSTR.
075B  066F         D  LOC, LOC, P2J       GO.
      *
      *BYTE INPUT AND CONTROL
      *
075C  44E3   WDR   L  MR4, YS             DATA TO MR4.
075D  4563         L  MAR, LOC            DELAY FOR PTYS.
075E  4DE1         L  IO, YD, ADRS        DEVICE ADRS.
075F  4D42         L  IO, MR4, DA         OUTPUT DATA.
0760  066F         D  LOC, LOC, P2J       GO.
      *
      *
0761  4DE1   WD    L  IO, YD, ADRS        DEVICE ADRS.
0762  4DAE         L  IO, MDR, DA+CS      OUTPUT DATA.
0763  4563         L  MAR, LOC            ADRS NEXT INSTR.
0764  066F         D  LOC, LOC, P2J       GO.
      *
      *
0765  48E3   RDR   L  AR, YS              NO OP PTYS RESET.
0766  4563         L  MAR, LOC            DELAY FOR PTYS.
0767  4DE1         L  IO, YD, ADRS        DEVICE ADRS.
0768  42D2         L  YS, IO, DR          INPUT DATA.
0769  066F         D  LOC, LOC, P2J       GO.
      *
      *
076A  4DE1   RD    L  IO, YD, ADRS        DEVICE ADRS.
076B  4ADE         L  MDR, IO, DR+CS      INPUT DATA.
076C  3200         C  MW                  STORE IT.
076D  4S63         L  MAR, LOC            ADRS NEXT INSTR.
076E  066F         D  LOC, LOC, P2J       GO.
      *
      *
076F  48E3   SSR   L  AR, YS              NO OP PTYS RESET.
0770  4563         L  MAR, LOC            DELAY FOR PTYS.
0771  4DE1         L  IO, YD, ADRS        DEVICE ADRS.
0772  44D3         L  MR4, IO, STAT       INPUT STATUS.
0773  4243         L  YS, MR4             LOAD IT.
0774  4B40         L  FLR, MR4, NC        SET FLAGS.
0775  066F         D  LOC, LOC, P2J       GO.
      *
      *
0776  4DE1   SS    L  IO, YD, ADRS        DEVICE ADRS.
0777  4ADF         L  MDR, IO, STAT+CS    INPUT STATUS.
0778  3200         C  MW                  STORE IT.
0779  4BAC         L  FLR, MDR, CS+NC     SET FLAGS.
077A  4560         L  MAR, LOC, NC        ADRS NEXT INSTR.
077B  066F         D  LOC, LOC, P2J       GO.
      *
      *
077C  44E3   OCR   L  MR4, YS             COMMAND TO MR4.
077D  4563         L  MAR, LOC            DELAY FOR PTYS.
077E  4DE1         L  IO, YD, ADRS        DEVICE ADRS.
077F  4D43         L  IO, MR4, CMD        OUTPUT COMMAND.
0780  066F         D  LOC, LOC, P2J       GO.
      *
      *
0781  4DE1   OC    L  IO, YD, ADRS        DEVICE ADRS.
0782  4DAF         L  IO, MDR, CMD+CS     OUT PUT COMMAND.
0783  4563         L  MAR, LOC            ADRS NEXT INSTR.
0784  066F         D  LOC, LOC, P2J       GO.
      *
      *
0785  44D1   AIR   L  MR4, IO, ACK        INPUT DEVICE ADRS.
0786  4D41         L  IO, MR4, ADRS       DEVICE ADRS.
0787  42D3         L  YS, IO, STAT        INPUT STATUS.
0788  4BE0         L  FLR, YS, NC         SET FLAGS.
0789  4E40         L  YD, MR4, NC         LOAD DEVICE NUMBER.
078A  066F         D  LOC, LOC, P2J       GO.
      *
      *
078B  4ED1   AI    L  YD, IO, ACK         INPUT DEVICE ADRS.
078C  4DE1         L  IO, YD, ADRS        DEVICE ADRS.
078D  4ADF         L  MDR, IO, STAT+CS    INPUT STATUS.
078E  3200         C  MW                  STORE IT.
078F  4BAC         L  FLR, MDR, CS+NC     SET FLAGS.
0790  4560         L  MAR, LOC, NC        ADRS NEXT INSTR.
0791  066F         D  LOC, LOC, P2J       GO.
      *
      *
      *
      *HALFWORD I/O
      *
0792  4AE3   WHR   L  MDR, YS             DATA TO MDR.
0793  4563   WH    L  MAR, LOC            WAIT FOR PTYS.
0794  4DE1         L  IO, YD, ADRS        ADDRESS DEVICE.
0795  4DAF         L  IO, MDR, DA+CS      OUTPUT HI.
0796  4DA2         L  IO, MDR, DA         OUTPUT LO.
0797  066F         D  LOC, LOC, P2J       GO.
      *
      *
      *SHORT FORM IMMEDIATES
      *
0798  4893   LIS   L  AR, IR
0799  940F         N  MR4, X'F'           MASK 2ND OP VALUE.
079A  6E4F         O  YD, MR4, NA         LOAD SET FLAGS.
079B  066F         D  LOC, LOC, P2J       GO.
      *
      *
079C  4893   LCS   L  AR, IR
079D  940F         N  MR4, X'F'           MASK 2ND OP VALUE.
079E  EE4C         S  YD, MR4, NA+NC      LOAD 2'S COMP, SET FLAGS.
079F  066F         D  LOC, LOC, P2J       GO.
      *
      *
07A0  6383   AIS   O  MR3, NULL, NF       SAVE AR.
07A1  4893         L  AR, IR
07A2  980F         N  AR, X'F'            MASK 2ND OP VALUE.
07A3  CE37         A  YD, MR3             PLUS 1ST OP.
07A4  066F         D  LOC, LOC, P2J       GO.
```

```
                 .
                 .
07A5  6383   SIS     O  MR3, NULL, NF        SAVE AR.
07A6  4893           L  AR, IR
07A7  940F           N  MR4, X'F'            MASK 2ND OP VALUE.
07A8  4833           L  AR, MR3              1ST OP.
07A9  EE47           S  YD, MR4              MINUS 2ND OP.
07AA  066F           D  LOC, LOC, P2J        GO.
                 .
                 .                         HALFWORD SHIFTS
07AB  48E3   SRSL    L  AR, YD               PTYS RESET.
07AC  4CA3   SRHL    L  CNTR, MDR            SET SHIFT COUNT.
07AD  3C00           C  RPT                  ODD ADRS.
                 .              NEXT INSTRUCTION REPEATED N TIMES
07AE  4EE5           L  YD, YD, SR+CO
                 .
07AF  6EEC           O  YD, YD, NA+NC        SET GL.
07B0  4560           L  MAR, LOC, NC
07B1  066F           D  LOC, LOC, P2J        GO.
                 .
                 .
07B2  0000           D  MRO, MRO             FILLER.
07B3  48E3   SL5L    L  AR, YD               PTYS RESET.
07B4  4C43   SLHL    L  CNTR, MDR            SET SHIFT COUNT.
07B5  3C00           C  RPT                  ODD ADRS.
                 .              NEXT INSTRUCTION REPEATED N TIMES
07B6  4FE9           I  YD, YD, SL+CO
                 .
07B7  6FEC           O  YD, YD, NA+NC        SET FLAGS.
07B8  4564           L  MAR, LOC, NC
07B9  066F           D  LOC, LOC, P2J        GO.
07BA  4CA3   SLHA    L  CNTR, MDR            SET SHIFT COUNT.
07BB  4EE9           L  YD, YD, SL+CO        SIGN TO CARRY.
07BC  4887           L  AR, NULL, SR         SIGN TO AR.
07BD  3C00           C  RPT                  ODD ADRS.
                 .              NEXT INSTRUCTION REPEATED N TIMES
07BE  4EE9           L  YD, YD, SL+CO
                 .
07BF  4EE4           L  YD, YD, SR+NC        COMPENSATE PRE-SHIFT.
07C0  6EE4           O  YD, YD, NC           SET FLAGS, INSERT SIGN.
07C1  4560           L  MAR, LOC, NC
07C2  066F           D  LOC, LOC, P2J        GO.
                 .
                 .
07C3  4CA3   SRHA    L  CNTR, MDR            SET SHIFT COUNT.
07C4  4EE9           L  YD, YD, SL+CO        SIGN TO CARRY.
07C5  3C00           C  RPT                  ODD ADRS.
                 .              NEXT INSTRUCTION REPEATED N TIMES
07C6  4EE6           L  YD, YD, SR+CI        PROPOGATE SIGN.
                 .
07C7  4EE7           L  YD, YD, SR           COMPENSATE PRE-SHIFT.
07C8  6EEC           O  YD, YD, NA+NC        SET FLAGS.
07C9  4560           L  MAR, LOC, NC
07CA  066F           D  LOC, LOC, P2J        GO.
                 .
                 .
                 .
                 *MULTIPLY HALFWORD UNSIGNED
                 .
07CB  0000           D  MR0, MR0             FILLER.
07CC  4AE3   MHUR    L  MDR, YS              MULTIPLICAND.
07CD  48A3   MHU     L  AR, MDR              LOAD MULTIPLICAND.
07CE  5E00           L  YD, X'0'             CLEAR HI PRODUCT.
07CF  3400           C  MPY                  MULTIPLY MODE.
07D0  4EE7           L  YD, YD, SR           SHIFT MULTIPLIER HI.
             *******  L***  YDP1, YDP1, SR***   SHIFT LO (IMPLIED)***.
             *IF CARRY RESULTS, DO NEXT INSTR
             *OTHERWISE RETURN TO SHIFT
07D1  CEE1           A  YD, YD, CO+NE        ADD MULTIPLICAND.
07D2  4EE7           L  YD, YD, SR           CORRECT PRODUCT BY
07D3  4FF7           L  YDP1, YDP1, SR       SHIFTING RIGHT ONCE.
07D4  4650           L  MAR, LOC, NC
07D5  066B           D  LOC, LOC, P2N
                 .
                 .
                 .
                 *AUTOLOAD
                 .
07D6  5007   AL      L  RAH, H(AL)           SET PAGE.
07D7  445B           L  MR4, MAR             TERMINAL ADRS.
07D8  5578           L  MAR, L(BINDV)
07D9  3100           C  MR                   FETCH DEUNO/COMMAND.
                 .
07DA  5580           L  MAR, X'80'           STARTING ADRS.
07DB  4DAD           L  IO, MDR, ADRS+CS     ADRS THE DEVICE.
07DC  4DA3           L  IO, MDR, CMD         OUTPUT COMMAND.
                 .
07DD  4BD3   INAL    L  FLR, IO, STAT        INPUT STATUS.
07DE  17F2           B  VGL, END             UNUSUAS STATUS EXIT.
07DF  18DD           B  C, INAL              JUST BUSY.
                 .
07E0  43D2           L  MR3, IO, DR
07E1  633F           O  MR3, MR3, NA         SET FLAGS.
07E2  1FE4           B  CVGL, INFST          NON ZERO.
07E3  51DD           L  RAL, L(INAL)         SKIP LEADER.
                 .
07E4  3100   INFST   C  MR
07E5  4A3F           L  MDR, MR3, CS         INSERT BYTE.
07E6  3200           C  MW                   STORE IT.
07E7  5801           L  AR, X'1'
07E8  C554           A  MAR, MAR, NC         INCREMENT ADRS.
07E9  4843           L  AR, MR4
07EA  E855           S  AR, MAR, CO          COMPARE TO FINAL.
07EB  18F1           B  C, EXIT              TRANSFER COMPLETE.
                 .
07EC  4BD3   LOOPIN  L  FLR, IO, STAT        INPUT STATUS.
07ED  17F2           B  VGL, END             UNUSUAL STATUS EXIT.
07EE  18EC           B  C, LOOPIN            JUST BUSY.
07EF  43D2           L  MR3, IO, DR
07F0  51E4           L  RAL, L(INFST)
```

```
                   *
07F1    5B00    EXIT      L      FLR, X'0'                     CLEAR FLAGS.
07F2    4560    END       L      MAR, LOC, NC                  ADRS NEXT INSTR.
07F3    066F              D      LOC, LOC, P2J                 GO.
07F4    0000              D      MR0, MR0                      FILLER.
                   *
                   *
                   *
                   *
                   *
                BINDV     EQU    X'0078'
                DIVPSW    EQU    X'009E'
                FLPENB    EQU    X'00A3'
                GENSWP    EQU    X'0019'
                TERM3     EQU    X'029A'
                          END
```

SYMBOL TABLE

| | | | | | |
|---|---|---|---|---|---|
| ABL | 06BE | ACH | 0737 | ACHR | 072F |
| ADDIT | 06A6 | ADDTO | 0690 | ADJST | 05C9 |
| AGTRR | 049B | AH | 0738 | AHM | 0732 |
| AHR | 0730 | AI | 078B | AIR | 0785 |
| AIS | 07A0 | AL | 07D6 | ALIKE | 05DF |
| ALIST | 06B2 | ATBL | 0688 | ATL | 06A5 |
| BCKCP | 0466 | BCKDIV | 045B | BGTRA | 04F7 |
| BINDV | 0078 | BOTTOM | 0687 | BREAK | 048D |
| BRK1 | 0490 | CEXIT | 0589 | CFDIV | 05AB |
| CFOP | 050R | CH | 0722 | CHR | 0721 |
| CLB | 0755 | CLH | 070C | CLHR | 070A |
| COMBK | 0414 | COMEX | 06B5 | COMFRR | 0474 |
| COMFRX | 047A | COMPEM | 05E6 | COMPR | 05E0 |
| COMSOR | 0453 | CONT | 04A1 | CRYTST | 0573 |
| CTEST | 051A | DFAULT | 0585 | DIFFER | 072C |
| DIVPSW | 009E | DIVRR | 044C | DIVRX | 044D |
| END | 08F2 | EQENT | 04C6 | EQULIZ | 04CE |
| EXADD | 04BE | EXDIV | 0469 | EXFUNC | 04B3 |
| EXIT | 07F1 | EXITC | 072A | EXPOF | 05A3 |
| EXPON | 0511 | EXPUF | 059B | EXSUB | 04B6 |
| EXTS | 0662 | FCOMP | 05DA | FDEXT | 05D5 |
| FDVLP | 05BA | FEND | 0576 | FFAULT | 058B |
| FIN | 0433 | FINAL | 056E | FINIS | 0432 |
| FLODRR | 060E | FLODRX | 0611 | FLPENB | 00A3 |
| FMPDV | 0500 | FSTORE | 0600 | FSTRT | 05B7 |
| FSUBRR | 0473 | FSUBRX | 0479 | GENSWP | 0019 |
| GO | 0494 | INAL | 07DD | INFST | 07E4 |
| LAEM | 0652 | LB | 0751 | LBR | 074E |
| LCS | 079C | LH | 071E | LHR | 071C |
| LIS | 079B | LISTOV | 06C1 | LOOPIN | 07EC |
| LOOPR | 0425 | LOOPW | 041D | LP | 05CE |
| LREM | 0635 | MDCLR | 059F | MHU | 07CD |

| | | | | | |
|---|---|---|---|---|---|
| MHUR | 07CC | NH | 0706 | NHR | 0704 |
| NOCMP | 043B | NRMAL | 04D4 | NRMFIN | 04F0 |
| NRMFO | 04E2 | OC | 0781 | OCR | 077C |
| OH | 0712 | OHR | 0710 | OK | 0419 |
| OKDIV | 0455 | OKMPY | 044A | OVIDV | 046F |
| OVEL | 0471 | QUOT | 05D2 | RAEM | 0643 |
| RBL | 06EB | RBL1 | 06F0 | RD | 076A |
| RDR | 0765 | REMOV | 06F1 | RH | 05F3 |
| RHR | 05EC | RLL | 0676 | RLREM | 0679 |
| RREM | 0627 | RRL | 0668 | RRMULT | 0435 |
| RRREM | 066B | RTBL | 06C9 | RTL | 06E8 |
| RTLF | 067F | RTRF | 0671 | RTSHFT | 058E |
| RWBRR | 0401 | RWBRX | 040F | RXMULT | 0436 |
| SALF | 0658 | SALF1 | 065B | SARF | 0649 |
| SCH | 073F | SCHR | 073C | SH | 0740 |
| SHFI | 05BF | SHLF | 063B | SHR | 073D |
| SHRF | 062D | SIS | 07A5 | SLA | 064F |
| SLHA | 07BA | SLHL | 07B4 | SLL | 0632 |
| SLSL | 07B3 | SRA | 0640 | SRHA | 07C3 |
| SRHL | 07AC | SRL | 0624 | SRSL | 07AB |
| SS | 0776 | SSR | 076F | STATRI | 0429 |
| STATRB | 0428 | STATWB | 041E | STB | 074A |
| STBR | 0744 | STEST | 046B | STH | 0700 |
| STMM | 043F | TERMB | 029A | TESTIR | 042E |
| TEST2 | 0430 | TESTAL | 0654 | TESTAR | 0645 |
| TESTRL | 067B | TESTRR | 066D | TESTSL | 0637 |
| TESTSR | 0629 | THI | 0684 | UNDER | 06EE |
| VFLAG | 068F | WB | 040F | WBR | 0400 |
| WD | 0761 | WDR | 075C | WH | 0793 |
| WHR | 0792 | WRONG | 05A9 | XH | 0718 |
| XHR | 0716 | ZRORST | 059D | | |

```
                *INITIAL STATICIZING
                *
0000    0000    INITIAL    D     MR0, MR0                      ALL ZEROES FOR TRAP.
0001    5002               L     RAH, H (INTENT)               POWER UP.
0002    512C               L     RAL, L (INTENT)
0003    0000               D     MR0, MR0                      FILLER.
                *
                *PHASE 1 INDEXED RS ENTRY
0004    48E3    AMODRS     L     AR, YS                        INDEX TO AR.
0005    CAA7               A     MDR, MDR                      EFFECTIVE OPERAND.
0006    0663               D     LOC, LOC, PC+CLR              TO PHASE 2.
0007    0000               D     MR0, MR0                      FILLER.
                *
                *PHASE 1 UNINDEXED RX ENTRY
0008    45A3    NMODRX     L     MAR, MDR                      A FIELD TO MAR.
0009    066B               D     LOC, LOC, P1                  TO PHASE 2.
                *
                *EXCHANGE BYTE
                *
000A    4EEF    EXBR       L     YD, YS, CS                    DO CROSS-SHIFT.
000B    066B               D     LOC, LOC, P2N                 GO.
                *
                *
                *PHASE 1 INDEXED RX ENTRY
000C    48E3    AMODRX     L     AR, YS                        INDEX TO AR.
000D    C5A7               A     MAR, MDR                      PLUS ADRS FIELD.
000E    066B               D     LOC, LOC, P1                  TO PHASE 2.
000F    0000               D     MR0, MR0                      FILLER.
                *
                *INSTRUCTION CLASS DECODED IN PHASE 0
                *
0010    49A3    PHASE 0    L     IR, MDR                       INSTR. TO MDR.
0011    4563               L     MAR, LOC                      ADRS 2ND HALF OR NEXT.
0012    08EB               D     AR, YD, P0                    TO PHASE 1 OR 2.
                *IF RR, AUTOMATIC LOAD AR FROM YD, IF NOT RR, INCREMENT LOC
                *
                *ENTER HELP FROM IDLE
0013    3004    ENTHLP     C     CWA                           RESET WAIT LAMP.
                *
                *
0014    21B0    P3 HELP    T     PPF+MPE+CATN+SNGL
0015    1247               B     G, HELP
0016    4B7F    TEST       L     FLR, PSW, CS                  TEST PSW BIT 4.
0017    182C               B     C, HSSVC                      FAST I/O SERVICE.
                *BIT 4 RESET NORMAL INTERRUPT SERVICE
0018    5540               L     MAR, L (OIPSW)
                *GENERALIZED PSW SWAP
0019    4A73    GENSWP     L     MDR, PSW
001A    3300               C     PW                            OVERRIDE PROTECT.
001B    5802               L     AR, X'2'
```

```
001C    C554                 A    MAR, MAR, NC
001D    4A63                 L    MDR, LOC
001E    3300                 C    PW                       STORE LOC.
001F    C654                 A    LOC, MAR, NC
0020    4563                 L    MAR, LOC
0021    0668                 D    LOC, LOC, MR             FETCH NEW PSW.
                *
                *
0022    47A3    LPST         L    PSW, MDR                 LOAD STATUS FIELD.
0023    4560                 L    MAR, LOC, NC
0024    066C                 D    LOC, LOC, MR+JAM         LOAC CC, EETCH NEW LOC.
0025    46A3                 L    LOC, MDR                 LOAD NEW LOC.
                *
0026    4B7F    TEST 1       L    FLR, PSW, CS             TEST PWS BIT 6.
0027    125B                 B    G, USREBL                INTERRUPTS ENABLED.
0028    4479    TEST 2       L    MR4, PSE, SL+CO          TEST BIT 0.
0029    1843                 B    C, WAIT                  HALTED.
002A    4563    P3 EXIT      L    MAR, LOC                 ADRS NEXT INSTR.
002B    066B                 D    LOC, LOC, P3             GO.
                *
                *
                *HIGH SPEED INTERRUPT SERVICE
002C    44D1    HSSVC        L    MR4, IO, ACK             ACKNOWLEDGE.
                *
                *
002D    4848    IOSVC        L    AR, MR4, SL+NC           2X DEVICE NUMBER.
002E    D5D0                 A    MAR, X'D0'               PLUS BIAS.
002F    3100                 C    MR                       FETCH SERVICE POINTER.
                *
                *
0030    5002    DOIT         L    RAH, H(ISBSVC)           OFF PAGE.
0031    5802                 L    AR, X'2'                 INCREMENT.
0032    4BA3                 L    FLR, MDR                 TEST BIT 16.
0033    45A3                 L    MAR, MDR
0034    1153                 B    L, ISBSVC                PROCESS ISB.
                *
                *IMMEDIATE INTERRUPT; SERVICE POINTER IS RESET
                *
0035    4A73                 L    MDR, PSW
0036    3300                 C    PW                       STORE PSW.
0037    C554                 A    MAR, MAR, NC
0038    4A63                 L    MDR, LOC
0039    3300                 C    PW                       STORE LOC.
003A    C657                 A    LOC, MAR                 BUMP ADRS.
003B    4563                 L    MAR, LOC
003C    0668                 D    LOC, LOC, MR
003D    47A0                 L    PSW, MDR, NC             NEW PSW VALUE.
003E    4560                 L    MAR, LOC, NC             ADRS NEXT INSTR.
003F    066F                 D    LOC, LOC, P2J            LOAD CC, GO.
                *
                *SIMULATE INTERRUPT
                *
0040    58FF    SINT         L    AR, X'FF'
0041    84A7                 N    MR4, MDR
0042    512D                 L    RAL, L(IOSVC)
                *
                *
                *
0043    3048    WAIT         C    SWA+CB                   SET WAIT LAMP.
0044    2510    WAIT1        T    ANT+CATN+PPF             IDLE LOOP.
0045    1144                 B    L, WAIT1
0046    5113                 L    RAL, L (ENTHLP)
                *
                *
0047    5002    HELP         L    RAH, H (PWRDWN)          SET PAGE.
0048    2010                 T    PPF
0049    1212                 B    G, PWRDWN                POWER FAIL.
004A    5000                 L    RAH, H(HELP)
004B    2020                 T    MPE
004C    1152                 B    L, ERROR                 NOT MPE.
                *
                *MACHINE MALFUNCTION INTERRUPT IF ENABLED
004D    3002                 C    CMP                      RESET PARITY ALARM.
004E    5538                 L    MAR, L (OMPSW)
004F    497F                 L    IR, PSW, CS
0050    4BB3                 L    FLR, IR4                 TEST PSW BIT 2.
0051    1219                 B    G, GENSWP                PSW SWAP.
                *
                *
0052    2400    ERROR        T    ATN
0053    1216                 B    G, TEST
0054    2180                 T    CATN+SNGL
0055    12A7                 B    G, CONSER
0056    5126                 L    RAL, L(TEST 1)
                *
                *
                *
                *
                     ORG X' 005B'
                *
                *
                *
                * USER INTERRUPS ARE ENABLED, TEST THE LIST
                *
005B    5580    USREBL       L    MAR,   X'80'
005C    3140                 C    MAR+CB
005D    58FF                 L    AR,    X'FF'
005E    5B00                 L    FLR,   X'0'
005F    45A3                 L    MAR, MDR                 LIST START ADRS.
0060    3100                 C    MR
0061    88A7                 N    AR, MDR                  TEST NO. USED TALLY.
0062    1264                 B    G, USRINT                NOT EMPTY.
                *LIST EMPTY
0063    5128                 L    RAL, L(TEST 2).
                *
                *QUEUE SERVICE INTERRUPT
                *
0064    5582    USRINT       L    MAR, X'82'               ADRS QUEUE SERVICE PSW.
0065    5119                 L    RAL, L(GENSWP)           DO SWAP.
```

```
                    *
                    *
                    *BRANCH INSTRUCTIONS
0066    45E3        BALR      L     MAR, YS                 BRANCH ADRS.
0067    4F63        BAL       L     YD, LOC                 LINK ADRS.
0068    5173                  L     RAL, L (DOBRAN)         BRANCH.
                    *
                    *
0069    45E3        BICR      L     MAR, YS                 BRANCH ADRS.
006A    48B3        BTC       L     AR, IR4                 MASK FIELD.
006B    8477                  N     MR4, PSW                AND WITH CC.
006C    1273                  B     G, DOBRAN               BRANCH.
006D    4563        BRNEXT    L     MAR, OCL                NO BRANCH.
006E    066B                  D     LOC, LOC, P2N           GO.
                    *               *
                    *
006F    45E3        BFCR      L     MAR, YS                 BRANCH ADRS.
0070    48B3        BFC       L     AR, IR4                 MASK FIELD.
0071    B477                  N     MR4, PSW                AND WITH CC.
0072    126D                  B     G, BTNEXT               NO BRANCH.
0073    4653        DOBRAN    L     LOC, MAR                BRANCH.
0074    4563                  L     MAR, LOC                ADRS NEXT INSTR.
0075    066B                  D     LOC, LOC, P2N           GO.
                    *
                    *
0076    43E3        BXLH      L     MR3, YD                 FETCH INDEX.
0077    4593                  L     MAR, IR                 SAVE IR.
0078    5810                  L     AR, x'10'               YD FIELD INCREMENT.
0079    C990                  A     IR, IR, NF+NC           POINT TO INCREMENT.
007A    4B5C                  L     FLR, MAR, CS+NC
007B    44E3                  L     MR4, YD
007C    C990                  A     IR, IR, NF+NC           POINT TO COMPARAND.
007D    4843                  L     AR, MR4
007E    C330                  A     MR3, MR3, NF+NC         INDEX PLUS INCREMENT.
007F    48F3                  L     AR, YD                  LOAD COMPARAND.
0080    4953                  L     IR, MAR                 RESTORE IR.
0081    4E33                  L     YD, MR3                 STORE INCREMENTED INDEX.
0082    1187                  B     L, XLE
0083    E435        BXH       S     MR4, MR3, CO            COMP-INDEX.
0084    1889                  B     C, BRANCH               BRANCH IF INDEX GREATER.
0085    4563        NOBRAN    L     MAR, LOC                NO BRANCH.
0086    066B        *         D     LOC, LOC, P2N           EXIT.
0087    E435        XLE       S     MR4, MR3, CO            COMP-INDEX.
0088    1885                  B     C, NOBRAN
0089    46A3        BRANCH    L     LOC, MDR                BRANCH ADRS TO LOC.
008A    4563                  L     MAR, LOC                ADRS NEXT INSTR.
008B    066B        *         D     LOC, LOC, P2N           EXIT.
                    *BRANCH ON CONDITION FORWARD OR REVERSE
008C    48B3        BFFR      L     AR, IR4                 MASK FIELD.
008D    8477                  N     MR4, PSW                AND WITH CC.
008E    126D                  B     G, BRNEXT               NO BRANCH.
008F    4863        DOFRB     L     AR, LOC                 BRANCH.
0090    F602                  S     LOC, X'2'               SET LOC TO 'HERE'.
0091    489B                  L     AR, IR, SL
0092    941E                  N     MR4, X'1E'              2X R2 FIELD.
0093    4B9F                  L     FLR, IR, CS             TEST OP.
0094    1196                  B     L, FRWD                 BRANCH FORWARD.
                    * REVERSE
0095    E44C                  S     MR4, MR4, NA+CN         2'S COMP DISPLACEMENT.
0096    4843        FRWD      L     AR, MR4
0097    0664                  A     LOC, LOC, NC            ADD TO VALUE OF 'HERE'.
0098    4563                  L     MAR, LOC                ADRS NEXT INSTR.
0099    066B                  D     LOC, LOC, P2N           GO.
                    *
009A    48B3        BTFR      L     AR, IR4                 MASK FIELD.
009B    8477                  N     MR4, PSW                AND WITH CC.
009C    128F                  B     G, DOFRB                BRANCH.
009D    516D                  L     RAL, L(BRNEXT)          NO BRANCH.
                    *
                    * CHECK DIVIDE FAULT ENABLE
009E    5548        DIVPSW    L     MAR, L(ODPSW)
009F    4474                  L     MR4, PSW, SR+NC
00A0    4B4F                  L     FLR, MR4, CS
00A1    1819                  B     C, GENSWP               PSW BIT 3 SET.
00A2    512A                  L     RAL, L(P3 EXIT)
                    *
                    * CHECK FLPT ARITHMETIC FAULT ENABLE
00A3    5528        FLPENB    L     MAR, L(OFPSW)
00A4    4B7F                  L     FLR, PSW, CS            TEST BIT 5.
00A5    1419                  B     V, GENSWP               ENABLED.
00A6    512A                  L     RAL, L(P3 EXIT)
                    *
                    * CONSOLE SERVICE
                    *
00A7    5401        CONSER    L     MR4, X'/1'              DISPLAY DEVICE NUMBER.
00A8    4D41                  L     IO, MR4, ADRS
00A9    49D3                  L     IR, O, STAT             DISPLAY STATUS TO IR.
00AA    2080                  T     SNGL
00AB    12C9                  B     G, DISPLA               VARI.
00AC    4BB3                  L     FLR, IR4                INTERPRET MODE.
00AD    11B9                  B     L, MWSL                 MEM WRITE OR SELECT.
00AE    12C2                  B     G, MREAD                MEM READ.
00AF    14CE                  B     V, DISPLY               SINGLE OR HALT.
                    * MUST BE RUN
00B0    4B93                  L     FLR, IR
00B1    1FB5                  B     CVGL, CLRWIT
                    * REGISTER SELECT IN OFF POSITION
                    *
00B2    4B7F                  L     FLR, PSW, CS
00B3    5000                  L     RAH, H(IOSVC)
00B4    182D                  B     C, IOSVC                COMSOLE INTERRUPT.
                    * SPECIAL INTERRUPT HANDLER NOT ENABLED
                    *
00B5    4778        CLRWIT    L     PSW, PSW, SL+NC
00B6    4774                  L     PSW, PSW, SR+NC         RESET WAIT BIT.
00B7    4563                  L     MAR, LOC                ADRS NEXT INSTR.
00B8    066B                  D     LOC, LOC, P3            GO.
                    *
                    *
00B9    4AD2        MWSL      L     MDR, IO, DR             LOW BYTE TO MDL.
```

```
00BA   4563            L   MAR, LOC             ADRS TO MAR MUST BE EVEN.
00BB   4ADE            L   MDR, 10, DR+CS       HIGH BYTE TO MDH.
00BC   12C6            B   G, SL                STATUS BIT 2-SELECT.
              *
00BD   3300   *        C   PW        MUST BE MEMORY WRITE
              *                                 OVERRIDE PROTECT.
00BE   0660   DISMEM   D   LOC, LOC             INCREMENT LOC.
00BF   4453            L   MR4, MAR             2ND OUTPUT REG.
00C0   43A3            L   MR3, MDR             1ST OUTPUT REG.
00C1   51F1            L   RAL, L(OUTDIS)
              *
00C2   14C9   MREAD    B   V, DISPLA            FLPT. MODE.
00C3   4563            L   MAR, LOC             ADRS OF DATA.
00C4   3100            C   MR                   FETCH.
00C5   51BF            L   RAL, L (DISMEM)      AND SHOW.
              *
00C6   4AA4   SL       L   MDR, MDR, SR+NC      RESET BIT 15.
00C7   46A8            L   LOC, MDR, SL+NC      TO GUARANTEE EVEN.
00C8   51CE            L   RAL, L(DISPLY).
              *
              *
00C9   48B3   DISPLA   L   AR, IR 4             TEST STATUS BITS 1 AND 2.
00CA   BB06   BB06     X   FLR, X'6'
00CB   16CE            B   VG, DISPLY           NOT FLPT.
00CC   4B93            L   FLR, IR
00CD   18E3            B   C, FLPREG            IF NOT FLPT REG, IS FLPT VARI.
00CE   4B93   DISPLY   L   FLR, IR              TEST REGISTER SELECTION.
00CF   18DB            B   C, REGDIS            GENERAL REGISTER.
00D0   12E7            B   G, INSDIS            INSTRUCTION REGISTER.
00D1   14EF            B   V, PSWDIS            PROGRAM STATUS WORD.
              *
              *IDLE LOOP
              *
00D2   3008   IDLE     C   SWA                  SET WAIT LAMP.
00D3   2010   IDLE 1   T   PPF
00D4   1247            B   G, HELP
00D5   2100            T   CATN
00D6   11D3            B   L, IDLE 1
00D7   3004            C   CWA                  RESET WAIT LAMP.
00D8   2080            T   SNGL
00D9   12B5            B   G, CLRWIT            EXECUTE VARI MODE.
00DA   51A7            L   RAL, L(CONSER)
              *
              *
00DB   5807   REGDIS   L   AR, X'7'
00DC   8997            N   IR, IR               MASK SELECTION.
00DD   5C05            L   CNTR, X'5'           SHIFT LEFT 5 PLACES.
00DE   4998   HLOOP    L   IR, IR, SL+NC        EVEN NUMBER IN YD FIELD.
00DF   10DE            B   CTR, HLOOP
              *
00E0   44E3            L   MR4, YD              2ND OUTPUT REG.
00E1   43F3            L   MR3, YDP1            1ST OUTPUT REG.
00E2   51F1            L   RAL, L (OUTDIS)
              *
00E3   4898   FLPREG   L   AR, IR, SL+NC
00E4   950E            N   MAR, X'E'            MASK SELECTION.
00E5   4558            L   MAR, MAR, SL+NC      MULTIPLY BY 4.
00E6   51E8            L   RAL, L (COMDIS)
              *
00E7   4563   INSDIS   L   MAR, LOC
00E8   3100   COMDIS   C   MR                   FETCH MS 16 BITS.
00E9   5802            L   AR, X'2'
00EA   44A3            L   MR4, MDR             2ND OUTPUT REG.
00EB   C554            A   MAR, MAR, NC
00EC   3100            C   MR                   FETCH IS 16 BITS.
00ED   43A3            L   MR3, MDR             1ST OUTPUT REG.
00FE   51F1            L   RAL, L (OUTDIS)
00EF   4473   PSWDIS   L   MR4, PSW             2ND OUTPUT REG.
00F0   4363            L   MR3, LOC             1ST OUTPUT REG.
              *
              *
              *OUTPUT DATA TO DISPLAY: MR3 THEN MR4
00F1   4D32   OUTDIS   L   IO, MR3, DA          DISPLAY 2, LO BYTE.
00F2   4D3E            L   IO, MR3, DA+CS       DISPLAY 2, HI BYTE.
00F3   4D42            L   IO, MR4, DA          DISPLAY 1, LO BYTE.
00F4   4D4E            L   IO, MR4, DA+CS       DISPLAY 1, HI BYTE.
00F5   51D2   *        L   RAL, L (IDLE)
              *
              *
                           ORG X'200'
              *
              *ILLEGAL INSTRUCTION TRAP
              *
0200   5530   ILPSW    L   MAR, L (OIPSW)
0201   4863            L   AR, LOC
0202   F604            S   LOC, X'4'            ANTICIPATE RX/RS.
0203   499F            L   IR, IR, CS           OP-CODE DOWN.
0204   4BB3            L   FLR, IR4             INTERPRET TYPE.
0205   1419            B   V, GENSWP            BIT 1 SET, RX OR RS.
0206   0660            D   LOC, LOC             IS RR.
0207   5119            L   RAL, L (GENSWP)
              *
              *LOAD PSW
              *
0208   46A3   LPSW     L   LOC, MDR             A+(X2).
0209   4563            L   MAR, LOC
020A   0668            D   LOC, LOC, MR         FETCH NEW PSW VALUE.
020B   5122            L   RAL, L (LPST)
              *
              *EXCHANGE PROGRAM STATUS
              *
020C   4E73   EPSR     L   YD, PSW              PSW 0:15 TO R1.
020D   47E0            L   PSW, YS, NC          R2 TO PSW 0:11.
020E   4460            L   MR4, LOC, NC         SAVE LOC.
020F   0664            D   LOC, LOC, JAM        LOAD PSW 12:15.
0210   4643            L   LOC, MR4             RESTORE LOC.
0211   5126            L   RAL, L (TEST 1)
              *
              *
              *POWER DOWN SEQUENCE
```

```
                                 *
0212     5526     PWRDWN      L     MAR, L (LOC)          SAVE LOCATION COUNTER.
0213     4A63                 L     MDR, LOC
0214     3300                 C     PW                    OVERRIDE PROTECT.
0215     5524                 L     MAR, L (PSW)          SAVE ON PROGRAM STATUS WORD.
0216     4A73                 L     MDR, PSW
0217     3320                 C     PW+SUT
0218     5700                 L     PSW, X'0'             SUPERVISOR MODE.
0219     5522                 L     MAR, L (PNTR)         REGISTER SAVE POINTER.
021A     3100                 C     MR
021B     5900                 L     IR, X'0'              CLEAR IR.
021C     45A3                 L     MAR, MDR
                  *                 *
                  *                 °
                  *STORE MULTIPLE
021D     5002     STM         L     RAH, H (STM)          SET PAGE.
021E     5810                 L     AR, X'10'             YD FIELD INCREMENT.
021F     ECBF                 S     CNTR, IR4 NA          2'S COMP YD FIELD.
0220     4463                 L     MR4, LOC              SAVE LOC.
0221     4653                 L     LOC, MAR              ADRS SAVE AREA.
                  *
0222     4563     STMLP       L     MAR, LOC
0223     4AE3                 L     MDR, YD               SAVE REGISTER.
0224     3200                 C     MW
0225     0660                 D     LOC, LOC              INCREMENT LOC.
0226     C994                 A     IR, IR, NC            BUMP YD FIELD.
0227     1022                 B     CTR, STMLP            DECREMENT COUNT.
                  *
0228     4643                 L     LOC, MR4              RESTORE LOC.
0229     2040                 T     UT                    UT SET IF POWER DOWN.
022A     1180                 B     L, LMEXT
022B     3001                 C     POW                   SYSTEM RESET.
                  *PROCESSOR LOCKS ON POWER DOWN, POWER UP BEGINS AT LOCATION ZERO
                  *
                  *
                  *
                  *INITIALIZE POWER UP SEQUENCE
                  *
022C     5524     INTENT      L     MAR, (PSW)            ADRS OF PSW SAVE AREA.
022D     3110                 C     MR                    FETCH PSW VALUE.
022E     47A0                 L     PSW, MDR, NC          UPDATE STATUS FIELD.
022F     5526                 L     MAR, L (LOC)          ADRS OF LOC SAVE AREA.
0230     066C                 D     LOC, LOC, MR+JAM      UPDATE CC FIELD, FETCH LOC.
0231     46A3                 L     LOC, MDR              UPDATE LOC.
0232     5522                 L     MAR,L.(PNTR)          ADRS OF REGISTER SAVE POINTE.
0233     3120                 C     MR+SUT
0234     5900                 L     IR, X'0'              CLEAR IR.
0235     45A3                 L     MAR, MDR
                  *
                  * LOAD MULTIPLE
0236     5002     IM          L     RAH, H (IM)           SET PAGE.
0237     5801                 L     AR, X'10'             YD FIELD INCREMENT.
0238     FCBF                 S     CNTR, IR4, NA         2'S COMP YD FIELD.
0239     4463                 L     MR4, LOC              SAVE LOC.
023A     4653                 L     LOC, MAR              ADRS FETCH AREA.
                  *
023B     4563     LMLOOP      L     MAR, LOC
023C     0668                 D     LOC, LOC, MR          FETCH, INCREMENT LOC.
023D     4EA3                 L     YD, MDR               LOAD REGISTER.
023E     C994                 A     IR, IR, NC            BUMP YD FIELD.
023F     103B                 B     CTR, LMLOOP           DECREMENT COUNT.
                  *
0240     4643                 L     LOC, MR4              RESTORE LOC.
0241     2040                 T     UT                    TEST IF LM INSTR.
0242     1180                 B     L, LMEXT              YES.
                  *
                  *
                  *
                  *
0243     5401     PPFINT      L     MR4, X'1'             DISPLAY ADDRESS.
0244     4D41                 L     IO, MR4, ADRS
0245     49D3                 L     IR, IO, STAT          DISPLAY STATUS TO IR.
0246     4BB3                 L     FLR, IR4              TEST MODE.
0247     174F                 B     VGL, NRUN             NOT RUN.
0248     5000                 L     RAH, H(CONSER)
0249     5538                 L     MAR, L(OMPSW)
024A     2200                 T     ARST                  RESTART.
024B     11C9                 B     L, DISPLA
024C     497F                 L     IR, PSW, CS
024D     4BB3                 L     FLR, IR4              TEST PSW02.
024E     1219                 B     G, GENSWP
                  *
024F     5000     NRUN        L     RAH, H(CONSER)
0250     2200                 T     ARST                  RESTART?
0251     12A7                 B     G, CONSER
0252     51C9                 L     RAL, L(DISPLA)
                  *
                  * INTERRUPT SERVICE BLOCK PROCESSING
                  *
0253     3180     ISBSVC      C     MR+SB                 FETCH FUNCTION WORD.
0254     4053                 L     MRO, MAR              SAVE ISB ADRS.
0255     49A3                 L     IR, MDR               FUNCTION.
0256     499F                 L     IR, IR, CS
0257     C554                 A     MAR, MAR, NC
0258     4BB3                 L     FLR, IR4
0259     1E9D                 B     CVG, NI01             INIT+NOP+NULL+DMT.
                  * READ OR WRITE
025A     3180     SVC1        C     MR+SB                 FETCH START ADRS.
025B     4D41                 L     IO, MR4, ADRS         ADDRESS THE DEVICE.
025C     42A3                 L     MR2, MDR              SAVE START ADRS.
025D     444F                 L     MR4, MR4, CS
025E     4A43                 L     MDR, MR4              DEVNO TO MDH.
025F     4ADF                 L     MDR, IO, STAT+CS      STATUS TO MDL.
0260     44A3                 L     MR4, MDR              DEVNO/STATUS.
0261     4C9F                 L     CNTR, IR, CS          NO. BYTES/INTERRUPT.
0262     C554                 A     MAR, MAR, NC
0263     3100                 C     MR                    FETCH FINAL ADRS.
0264     4B43                 L     FLR, MR4              TEST DEVICE STATUS.
0265     1FB7                 B     CVGL, BSTAT           BAD STATUS.
                  * STATUS OK
0266     41A3                 L     MR1, MDR              FINAL ADRS.
```

```
0267  4523                L  MAR, MR2              START ADRS.
0268  5801                L  AR, X'1'              INCREMENT VALUE.
0269  4BB3                L  FLR, IR4              TEST FUNCTION.
026A  1188                B  L, WRITE
           •
           •
026B  3100  READ          C  MR
026C  42D2                L  MR2, IO, DR
026D  4A2F                L  MDR, MR2, CS          READ DATA.
026E  3300                C  PW                    INSERT BYTE.
026F  C554                A  MAR, MAR, NC          STORE IT.
0270  106B                B  CTR, READ             INCREMENT ADRS.
                                                   TEST AND DECREMENT.
           •
           •
           •
0271  4A53  END 1         L  MDR, MAR              INCREMENTED START ADRS.
0272  C507                A  MAR, MR0
0273  3340                C  PW+CB                 RESTORE.
0274  4813                L  AR, MR1               FINAL.
0275  E8A7                S  AR, MDR               COMPARE TO START.
0276  188E                B  C, TERM1              DONE.
           •
           •
0277  4B93  END 2         L  FLR, IR               TEST FUNCTION BIT 5.
0278  14DB                B  V, TCHAR
           •
           •
0279  2040  END 3         T  UT                    QUEUE FLAG.
027A  1282                B  G, FLAGS
           * NO USER INTERRUPT QUEUED
027B  5000                L  RAH, H(WAIT)
027C  2400                T  ATN
027D  1214                B  G, P3HELP
027F  4479                I  MR4, PSW, SI+CO       TEST WAIT BIT.
027F  1843                B  C, WAIT               IS SET.
           •
0280  4563  LMEXT         L  MAR, LOC
0281  066B                D  LOC, LOC, P3
           •
           •
0282  4B7F  FLAGS         L  FLR, PSW, CS          TEST PSW06.
0283  5000                L  RAH, H(GENSWP)
0284  1264                B  G, USRINT
0285  2400                T  ATN
0286  1214                B  G, P3HELP
0287  5128                L  RAL, L(TEST2)
           •
           •
           •
0288  3100  WRITE         C  MR
0289  4DAE                L  IO, MDR, DA+CS        OUTPUT DATA.
028A  42AF                L  MR2, MDR, CS
028B  C554                A  MAR, MAR, NC          INCREMENT ADRS.
028C  1088                B  CTR, WRITE            TEST, DECREMENT.
028D  1F71                B  CVGL, END1
           •
028E  4893  TERM 1        L  AR, IR
028F  7940                O  IR, X'40'
0290  499F                L  IR, IR, CS            SET NOP.
0291  4A93  TERM 4        L  MDR, IR               MODIFIED FUNCTION.
0292  4503                L  MAR, MRO
0293  3300                C  PW                    RESTORE FUNCTION.
           •
0294  4853                L  AR, MAR
0295  4A43                L  MDR, MR4
0296  F502                S  MAR, X'2'
0297  3340                C  PW+CB                 STORE DEVNO/STATUS .
           •
           •
0298  4B9F  TERM 2        L  FLR, IR, CS           TEST FUNCTION BIT 6.
0299  12BE                B  G, QUEUE
           •
           •
029A  4BB3  TERM 3        L  FLR, IR4              TEST FUNCTION BIT 10.
029B  12C7                B  G, CHAIN
029C  5179                L  RAL, L(END 3)
           •
           •
           •
029D  3040  NI01          C  CB
029E  1479                B  V, END 3              NOP.
029F  18AA                B  C, NI02               INIT.
02A0  499F  NI03          L  IR, IR, CS
02A1  1191                B  L, TERM 4             NULL.
            *DMT
02A2  3180                C  MR+SB                 FETCH COUNT.
02A3  5B00                L  FLR, X'0'
02A4  48A3                L  AR, MDR               COUNT.
02A5  5201                L  MR2, X'1'
02A6  EA27                S  MDR, MR2              DECREMENT.
02A7  3340                C  PW+CB                 RESTORE.
02A8  1379                B  GL, END 3             NOT ZERO.
            * COUNT ZERO
02A9  5191                L  RAL, L(TERM 4)
           •
           •
02AA  499F  NI02          L  IR, IR, CS
02AB  4998                L  IR, IR, SL+NC
02AC  4994                L  IR, IR, SR+NC         RESET INIT.
02AD  4A93                L  MDR, IR
02AE  4503                L  MAR, MRO
02AF  3300                C  PW                    RESTORE.
02B0  4BB3                L  FLR, IR4              TEST FUNCTION BIT 8.
02B1  18D5                B  C, OC1                OC1.
02B2  499F                L  IR, IR, CS
02B3  C554                A  MAR, MAR, NC
02B4  4BB3                L  FLR, IR4              TEST FUNCTION BIT 2.
02B5  12A0                B  G, NI03               DMT OR NULL.
02B6  105A                B  CTR, SVC1
           •
           •
02B7  58C3  BSTAT         L  AR, X'C3'             SET INIT, NOP, QUEUE.
```

```
02B8    6897            O    AR, IR
02B9    B901            X    IR, X'01'              CLEAR HI/LOW.
02BA    489F            L    AR, IR, CS
02BB    7830            O    AR, X'30'
02BC    B930            X    IR, X'30'              RESET CHAIN, DO.IT.
02BD    1F91            B    CVGL, TERM 4
                *
                *
02BE    5580    QUEUE   L    MAR, X'80'
02BF    3140            C    MR+CB                  ADDRS OF QUEUE.
02C0    5B00            L    FLR, X'0'
02C1    5006            L    RAH, H(ATBL)           OFF PAGE.
02C2    4373            L    MR3, PSW               SAVE PSW.
02C3    5700            L    PSW, X'0'              SUPERVISOR MODE.
02C4    45A3            L    MAR, MDR
02C5    3102            C    MR+SUT                 SET QUEUE FLAG.
02C6    5188            L    RAL, L(ATBL)
                *
                * RETURNS TO TERM 3
                *
                *
02C7    4803    CHAIN   L    AR, MRO                ISB ADRS.
02C8    F503            S    MAR, X'3'
02C9    3140            C    MR+CB                  FETCH DEVNO/STATUS.
02CA    5000            L    RAH, H(DO IT)
02CB    F505            S    MAR, X'5'
02CC    48AF            L    AR, MDR, CS
02CD    3100            C    MR                     FETCH NEW SERVICE POINTER.
02CE    94FF            N    MR4, X'FF'             DEVNO.
02CF    4848            L    AR, MR4, SL+NC
02D0    D5D0            A    MAR, X'D0'             ADRS SERVICE POINTER.
02D1    3300            C    PW                     STORE NEW POINTER.
02D2    1130            B    L, DOIT                DO IT IF FUNCTION 11 SET.
02D3    5002            L    RAH, H(END 3)
02D4    5179            L    RAL, L(END 3)
                *
                *
02D5    5805    OC1     L    AR, X'5'
02D6    C504            A    MAR, MRO, NC
02D7    3140            C    MR+CB                  FETCH COMMAND BYTE.
02D8    4D41            L    IO, MR4, ADRS          ADRS THE DEVICE
02D9    4DAF            L    IO, MDR, CMD,+CS       OUTPUT COMMAND
02DA    5179            L    RAL, L(END 3)
                *
                *
02DB    5805    TCHAR   L    AR, X'5'
02DC    C504            A    MAR, MRO, NC
02DD    3140            C    MR+CB
02DE    58FF            L    AR, X'FF'
02DF    8327            N    MR3, MR2               MASK LAST CHAR XFERRED
02E0    88A7            N    AR, MDR                TERMINAL CHARACTER.
02E1    5800            L    FLR, X'0'
02E2    A837            X    AR, MR3                COMPARE.
02E3    1279            B    G, END 3               NO MATCH
02E4    518E            L    RAL, L(TERM 1)         MATCH.
                *
                *
                *
                *SUPERVISOR CALL
                *
02E5    5594    SVC     L    MAR, X'94'
02E6    3300            C    PW                     STORE A+(X2) PARAMETER.
02E7    4363            L    MR3, LOC               SAVE LOC.
02E8    4653            L    LOC, MAR
02E9    0660            D    LOC, LOC
02EA    4563            L    MAR, LOC               ADRS X'96'.
02EB    4A73            L    MDR, PSW
02EC    3300            C    PW                     STORE PSW.
02ED    0660            D    LOC, LOC
02EE    48B8            L    AR, IR4, SL+NC
02EF    4563            L    MAR, LOC               ADRS X'98'.
02F0    4A33            L    MDR, MR3
02F1    3300            C    PW                     STORE LOC.
02F2    0660            D    LOC, LOC
02F3    981E            N    AR, X'1E'              2X R1 FIELD.
02F4    4563            L    MAR, LOC
02F5    0668            D    LOC, LOC, MR
02F6    47A0            L    PSW, MDR, NC           NEW PSW VALUE.
02F7    D59C            A    MAR, X'9C'             2X R1 FIELD+X'9C'
02F8    066C            D    LOC, LOC, MR+JAM       FETCH, LOAD CC.
02F9    46A3            L    LOC, MDR               NEW LOC VALUE.
02FA    4563            L    MAR, LOC               ADRS NEXT INSTR.
02FB    066B            D    LOC, LOC, P2N          GO.
                *
                *
                PNTR    EQU  X'0022'
                PSW     EQU  X'0024'
                LOC     EQU  X'0026'
                OFPSW   EQU  X'0028'
                NEPSW   EQU  X'002C'
                OTPSW   EQU  X'0030'
                OMPSW   EQU  X'0038'
                OIPSW   EQU  X'0040'
                ODPSW   EQU  X'0048'
                ATBL    EQU  X'0688'
                *
                *
                *
                        END
```

SYMBOL TABLE

| | | | | | |
|---|---|---|---|---|---|
| AMODRS | 0004 | AMODRX | 000C | ATBL | 0688 |
| BAL | 0067 | BALR | 0066 | BFC | 0070 |
| BFCR | 006F | BFFR | 008C | BRANCH | 0089 |
| BRNEXT | 006D | BSTAT | 02B7 | BTC | 006A |
| BTCR | 0069 | BTFR | 009A | BXH | 0083 |
| BXLH | 0076 | CHAIN | 02C7 | CLRWIT | 00B5 |
| COMDIS | 00E8 | CONSER | 00A7 | DISMEM | 00BE |
| DISPLA | 00C9 | DISPLY | 00CE | DIVPSW | 009E |
| DOBRAN | 0073 | DOFRB | 008F | DOIT | 0030 |
| END1 | 0271 | END2 | 0277 | END3 | 0279 |
| ENTHLP | 0013 | EPSR | 020C | ERROR | 0052 |
| EXBR | 000A | FLAGS | 0282 | FLPENB | 00A3 |
| FLPREG | 00E3 | FRWD | 0096 | GENSWP | 0019 |
| HELP | 0047 | HLOOP | 00DE | HSSVC | 002C |
| IDLF | 00D2 | IDLF1 | 00D3 | ILPSW | 0200 |
| INITAL | 0000 | INSDIS | 00E7 | INTENT | 022C |
| IOSVC | 002D | ISBSVC | 0253 | LM | 0236 |
| LMEXT | 0280 | LMLOOP | 023B | LOC | 0026 |
| LPST | 0022 | LPSW | 0208 | MREAD | 00C2 |
| MWSL | 00B9 | NFPSW | 002C | NIO1 | 029D |
| NI02 | 02AA | NI03 | 02A0 | NMODRX | 0008 |
| NOBRAN | 0085 | NRUN | 024F | OC1 | 02D5 |
| ODPSW | 0048 | OFPSW | 0028 | OIPSW | 0040 |
| OMPSW | 0038 | OTPSW | 0030 | OUTDIS | 00F1 |
| P3EXIT | 002A | P3HELP | 0014 | PHASE0 | 0010 |
| PNTR | 0022 | PPFINT | 0243 | PSW | 0024 |
| PSWDIS | 00FF | PWRDWN | 0212 | QUEUE | 02BE |
| READ | 026B | REGDIS | 00DB | SINT | 0040 |
| SL | 00C6 | SIM | 021D | STMLP | 0222 |
| SVC | 02E5 | SVC1 | 025A | TCHAR | 02DB |
| TERM1 | 028E | TERM2 | 0298 | TERM3 | 029A |
| TERM4 | 0291 | TEST | 0016 | TEST1 | 0026 |
| TEST2 | 0028 | USREB1 | 005B | USRINT | 0064 |
| WAIT | 0043 | WAIT1 | 0044 | WRITE | 0288 |
| XLE | 0087 | | | | |

What is claimed is:

1. A method for performing a microroutine built into a read only memory in accordance with a program being run on a processor having user's instructions in main memory to simulate external device interrupt signals comprising the steps of generating from said main memory a simulated external device interrupt signal, generating a device number defining said simulated interrupt signal, acknowledging within said read only memory containing said microroutine said simulated interrupt signals from said processor in accordance with said user's instructions, and performing programmed instructions of said microroutine after acknowledgement of said simulated interrupt signals without interrupting a program being run.

2. A method for performing a microroutine built into a read only memory in accordance with a program being run on a processor having user's instructions in main memory and external devices which cause interrupt signals having discrete device numbers comprising the steps of acknowledging an interrupt signal within said read only memory and obtaining the device number of that interrupt signal for defining a particular service pointer, fetching an interrupt service block function located in said main memory corresponding to said particular service pointer, and performing input-output service for said external devices in accordance with said interrupt service block function without interrupting said program that is being currently run.

3. The method of claim 1 in which there is provided the additional step of counting interrupt signals, and decrementing said count after each interrupt signal, and entering the currently running program after said interrupt signal is received.

4. A processor system having a main memory to perform user's instructions and acknowledge interrupts from external devices having discrete device numbers in accordance with microroutines stored in a read only memory, comprising:

a. decode read only memory means for holding individual starting addresses each related to a particular one of said user's instruction microroutines, b. an instruction register, c. first decode instruction means for fetching a user's instruction from said main memory and placing it in said instruction register, d. second decode instruction means for fetching the next user's instruction from said main memory, and e. means for acknowledging said interrupts within said read only memory in accordance with a predetermined microroutine contained within said read only memory without interrupting a program being run within said main memory.

5. The processor system of claim 4 wherein means for acknowledging said interrupts comprise:

a. an interrupt signal generated from said external devices, said interrupt signal to be acknowledged between successive user instructions, and;

b. a predetermined microroutine to perform functions specified by said external device and return to said user's instructions upon completion.

6. The processor system of claim 4 in which there is provided:

a. a service pointer corresponding to said interrupt signal fetched from a service pointer table in said main memory, b. an interrupt service block function located in said main memory to be fetched in accordance with the number of said service pointer, and;

c. means for performing input - output service for said interrupt means in accordance with said interrupt service block function without interrupting said program that is being currently run.

* * * * *